United States Patent [19]
Byers et al.

[11] Patent Number: 5,828,823
[45] Date of Patent: Oct. 27, 1998

[54] METHOD AND APPARATUS FOR STORING COMPUTER DATA AFTER A POWER FAILURE

[75] Inventors: Larry L. Byers, Apple Valley; Gary R. Robeck, Albertville, both of Minn.

[73] Assignee: Unisys Corporation, Blue Bell, Pa.

[21] Appl. No.: 845,643

[22] Filed: Apr. 25, 1997

Related U.S. Application Data

[63] Continuation of Ser. No. 396,951, Mar. 1, 1995.

[51] Int. Cl.$^6$ .................................................... G06F 12/16
[52] U.S. Cl. .................. 395/182.22; 711/161; 395/182.2
[58] Field of Search ..................................... 395/440, 441, 395/439, 488, 489, 182.2, 182.12, 182.22, 750.08; 365/229; 307/64; 711/161, 162; 707/204

[56] References Cited

U.S. PATENT DOCUMENTS

| | | | |
|---|---|---|---|
| 3,801,963 | 4/1974 | Chen | 395/182.12 |
| 4,020,466 | 4/1977 | Cordi et al. | 340/172.5 |
| 4,084,231 | 4/1978 | Capozzi et al. | 364/200 |
| 4,143,282 | 3/1979 | Graf et al. | 395/182.12 |
| 4,298,929 | 11/1981 | Capozzi | 364/200 |
| 4,323,987 | 4/1982 | Holtz et al. | 395/182.12 |
| 4,451,742 | 5/1984 | Aswell | 395/182.2 |
| 4,646,229 | 2/1987 | Boyle | 364/200 |
| 4,658,352 | 4/1987 | Nagasawa | 395/182.12 |
| 4,853,843 | 8/1989 | Ecklund | 364/200 |
| 5,018,148 | 5/1991 | Patel et al. | 395/182.2 |
| 5,032,979 | 7/1991 | Hecht et al. | 364/200 |
| 5,089,958 | 2/1992 | Horton et al. | 395/575 |
| 5,093,787 | 3/1992 | Simmons | 364/406 |
| 5,117,324 | 5/1992 | Johnson, Jr. | 395/182.2 |
| 5,133,060 | 7/1992 | Weber et al. | 395/440 |
| 5,146,573 | 9/1992 | Sato et al. | 395/425 |
| 5,193,176 | 3/1993 | Brandin | 395/182.12 |
| 5,195,100 | 3/1993 | Katz et al. | 395/182.2 |
| 5,202,969 | 4/1993 | Sato et al. | 395/425 |
| 5,222,224 | 6/1993 | Flynn et al. | 395/425 |
| 5,241,508 | 8/1993 | Berenguel et al. | 365/229 |
| 5,307,484 | 4/1994 | Baker et al. | 395/600 |
| 5,315,161 | 5/1994 | Robinson et al. | 395/182.22 |
| 5,341,493 | 8/1994 | Yanai et al. | 395/488 |
| 5,396,637 | 3/1995 | Harwell et al. | 395/182.12 |
| 5,448,719 | 9/1995 | Schultz et al. | 395/182.03 |
| 5,515,333 | 5/1996 | Fujita et al. | 365/229 |
| 5,519,831 | 5/1996 | Holzhammer | 395/182.2 |
| 5,544,312 | 8/1996 | Hasbun et al. | 395/183.18 |
| 5,588,129 | 12/1996 | Ballard | 395/440 |
| 5,615,353 | 3/1997 | Lautzenheiser | 395/463 |

OTHER PUBLICATIONS

Kaunitz et al., "Audit Trail Compaction for Database Recovery", *Communications of the ACM*, vol. 27, No. 7, Jul. 1984.

Verhofstad, "Recovery Techniques for Database Systems", *Computing Surveys*, vol. 10, No. 2, Jun. 1978.

Gray et al., "The Recovery manager of the System R Database Manager", *Computing Surveys*, vol. 13, No. 2, Jun. 1981.

*Primary Examiner*—Eddie P. Chan
*Assistant Examiner*—Hiep T. Nguyen
*Attorney, Agent, or Firm*—Nawrocki, Rooney & Sivertson, P.A.

[57] ABSTRACT

A method and apparatus for efficiently download and/or upload critical data elements between a computer's memory to/from a data save disk system, when a failure of a primary power source is detected. This is accomplished by coupling the data save disk system directly to the memory module such that the data elements in the memory module may be downloaded directly to the data save disk system without any intervention by a host computer. This configuration may have a number of advantages. First, the speed at which the data elements may be downloaded from the memory module to the data save disk system may be enhanced due to the direct coupling therebetween. Second, significant power savings may be realized because only the memory module and the data save disk system need to be powered by a secondary power source to effect the download operation. This may significantly increase the amount of time that the secondary power source may power the system thereby increasing the number of data elements that can be downloaded from the memory.

43 Claims, 23 Drawing Sheets

| SIGNAL | SIGNAL DESCRIPTION |
|---|---|
| D(0-31) | DSD DATA BUS (I,O,Z) - BI-DIRECTIONAL MAIN DATA PATH FOR ALL OPERATIONS - ASSERTED BY BUS MASTER FOR WRITE OPERATIONS AND BY BUS SLAVE FOR READ OPERATIONS |
| DP(0-3) | DSD DATA BUS PARITY (I,O,Z) - DP0 = PARITY FOR D0-7. DP1 = PARITY FOR D8-15. DP2 = PARITY FOR D16-23. DP3 = PARITY FOR D24-31. |
| A(0-29) | DSD ADDRESS BUS (I,O,Z) - BI-DIRECTIONAL ADDRESS BUS FOR ALL DEVICES ATTACHED TO THE INTERFACE - ASSERTED BY THE BUS MASTER. |
| ADS/ | ADDRESS STATUS (I,O,Z) - WHEN ASSERTED BY THE BUS MASTER, THE CONTENTS OF THE ADDRESS BUS ARE VALID - DEFINES THE START OF A BUS CYCLE |
| W-R/ | WRITE/READ (I,O,Z) - INDICATES THE DIRECTION OF DATA TRANSFER RELATIVE TO THE BUS MASTER - DRIVEN BY THE BUS MASTER. WRITE=1. READ=0. |
| HOLD/ | HOLD (O) - ASSERTED BY DEVICE TO INDICATE THAT IT IS REQUESTING BUS MASTERSHIP |
| HLDAI/ | HOLD ACKNOWLEDGE (I) -ASSERTED BY BUS ARBITRATION LOGIC TO INDICATE THAT THE PREVIOUS BUS MASTER HAS RELINQUISHED USE OF THE BUS. |
| BCLK | BUS CLOCK (I) - CLOCK SIGNAL THAT CONTROLS THE DMA PORTION OF THE NCR53C720 |
| RESET/ | CHIP RESET (I) - FORCES A SYNCHRONOUS FULL CHIP RESET OF THE NCR53C720 - MUST BE ASSERTED FOR A MINIMUM OF 15 BUS CYCLES |
| CS/ | CHIP SELECT (I) - SELECTS THE NCR53C720 AS A SLAVE DEVICE - CONNECTED TO ADDRESS BIT 6 IN THE DSD APPLICATION |
| IRQ/ | INTERRUPT (O) - INDICATES THAT SERVICE IS REQUIRED FROM THE USBC |

FIG. 10A

| SIGNAL | SIGNAL DESCRIPTION |
|---|---|
| BE3/ | BYTE ENABLE THREE (I,O,Z) - ENABLES DATA TRANSFER ON DATA BUS LINES D0-D7 - ASSERTED BY BUS MASTER |
| BE2/ | BYTE ENABLE TWO (I,O,Z) - ENABLES DATA TRANSFER ON DATA BUS LINES D8-D15 - ASSERTED BY BUS MASTER |
| BE1/ | BYTE ENABLE ONE (I,O,Z) - ENABLES DATA TRANSFER ON DATA BUS LINES D16-D23 - ASSERTED BY BUS MASTER |
| BE0/ | BYTE ENABLE ZERO (I,O,Z) - ENABLES DATA TRANSFER ON DATA BUS LINES D24-D31 - ASSERTED BY BUS MASTER |
| READYI/ | READY-IN (I) - SIGNAL FROM SLAVE DEVICE TO BUS MASTER INDICATING THAT SLAVE IS READY TO TRANSFER DATA |
| READYO/ | READY-OUT (O) - ASSERTED TO INDICATE THE END OF A SLAVE MODE CYCLE - THE NCR53C720 PROVIDES THIS SIGNAL TO TERMINATE A SLAVE CYCLE |
| MASTER/ | MASTER STATUS (O) - ASSERTED BY THE NCR53C720 WHEN IT BECOMES THE MASTER |
| BS(2-0) | BUS MODE SELECT (I) - SELECTS THE BUS MODE (MOTOROLA OR INTEL) AND ADDRESSING MODE (BIT OR LITTLE ENDIAN) - IN THE DSD APPLICATION, BS(2-0) = "010" THEREBY SELECTING 80386DX LIKE (BUS MODE 4) AND BIG ENDIAN BUS MODE. |
| AUTO/ | SCRIPTS AUTOSTART MODE (I) - SELECTS EITHER AUTO OR MANUAL SCRIPTS START MODE. WHEN AUTO/=0, SCRIPTS STARTS AT ADDRESS-0 (ADDRESS IN DSP REGISTER OF NCR DEVICE) AUTOMATICALLY FOLLOWING A CHIP RESET. WHEN AUTO/=1, SCRIPTS STARTS AFTER THE DSP REGISTER HAS BEEN LOADED BY THE USBC. IN THE DSD APPLICATION, AUTO/ IS SET TO 1. |

FIG. 10B

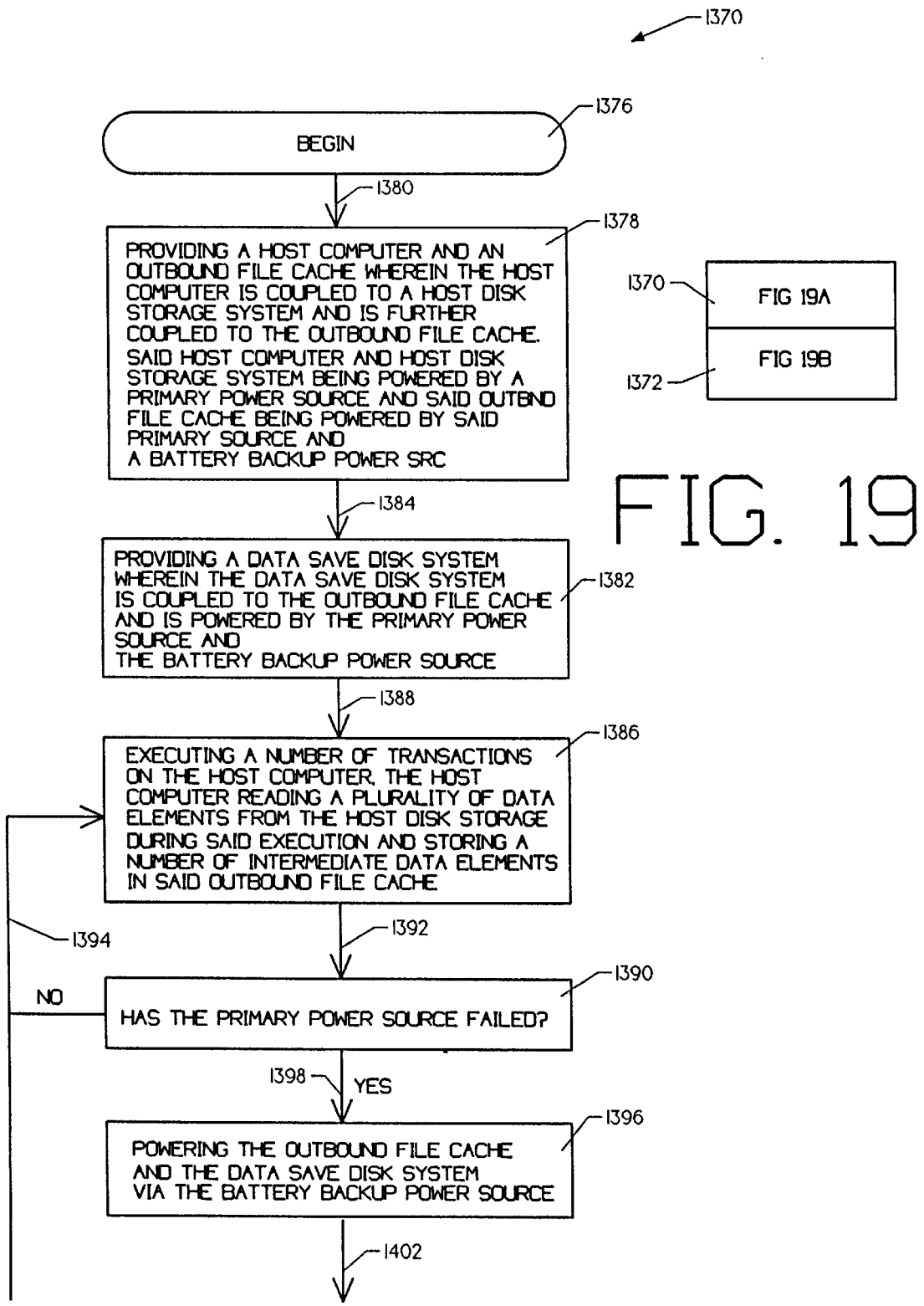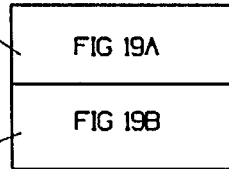
FIG. 19
FIG. 19A

METHOD AND APPARATUS FOR STORING COMPUTER DATA AFTER A POWER FAILURE

CROSS REFERENCE TO CO-PENDING APPLICATIONS

The present application is a continuation of U.S. Ser. No. 08/396,951, filed Mar. 1, 1995, entitled "Method and Apparatus for Storing Computer Data After a Power Failure", and is also related to U.S. patent application Ser. No. 08/173,459, filed Dec. 23, 1993, entitled "Extended Processing Complex for File Caching", and U.S. patent application Ser. No. 08/172,663, filed Dec. 23, 1993, entitled "Partial Block Updates in a File Cache System", both which are assigned to the assignee of the present invention and both are incorporated herein by reference.

BACKGROUND OF THE INVENTION

1. Field of the Invention

The present invention generally relates to general purpose digital data processing systems which operate on a data base and more particularly relates to such systems which have mechanisms for maintaining the integrity of the data base in the event of a system failure.

2. Description of the Prior Art

In many modern computer applications, the integrity of a corresponding data base is of great importance. For example, in the banking industry, computers are used to process transactions and store the results thereof. Each of these transactions may involve the transfer of money or the like from one account to another. Clearly, the loss or miscalculation of even a single transaction can have significant adverse affects on the integrity of the banking industry.

Similarly, in the airline industry, the integrity of a seat reservation data base is of great importance. Seat reservations are typically controlled by a high reliability computer system. Travel agents or the like may make the seat reservation by accessing the seat reservation data base.. In this application, each transaction may reserve a seat on a particular flight. The loss of a transaction may result in having a seat being assigned to more than one passenger or other similar problems.

In these exemplary applications, the integrity of the corresponding data base cannot be compromised, even when a failure occurs within the computer system. Furthermore, each and every transaction which is submitted to the computer system must be accounted for to avoid the situation where a user may think a transaction has been processed when in fact it has not.

In a typical high reliability computer system, a host processor may process a transaction by reading relevant data from a data base, performing calculations thereon, and writing the results back to the data base. The data base may be stored on a host disk storage system which may be coupled to the host computer. For those transactions which have not yet been read by the host processor when a failure is detected, the corresponding portion of the data base is not affected. For those transactions which have already been processed and written back to the host disk storage system when a failure is detected, the corresponding portion of the data base has been updated and therefore is also not affected. A problem may arise, however, for those transactions which are being processed at the time of the failure. For these transactions, the host computer may read the corresponding portion of the data base from the disk storage system and begin performing calculations thereon. For many of these transactions, the host computer may write temporary data elements to a cache memory or the like, which may then be used to arrive at a desired result. If a failure is detected during this stage, the transaction may be lost and the integrity of the data base may be compromised.

In recent years, data base recovery techniques have been developed to overcome some of the above reference limitations. In one such technique, the status of each transaction may be tracked as the transactions is processed. After a failure has been detected, the computer may attempt to reconstruct the state of the data base using the status of each transaction as a guide. Thus, modern high reliability computer system may detect many types of faults within the computer system and may attempt to preserve the integrity of the data base. While these techniques have been useful in dealing with some types of computer failures, a number of limitations still exist.

One of these limitations is that the failure of a power source of a corresponding computer system may cause the entire system to become non-operable thereby not allowing the data base recovery techniques to be utilized. That is, an un-interrupted power source may be required to sustain the reliability features provided therein. In such systems, any transactions in progress at the time of the power failure may be lost and the integrity of the data base may be compromised. As stated above, this may be unacceptable for many high reliability computer applications.

Some prior art systems attempt to overcome this limitation by increasing the reliability of the power source itself. In some instances, an in-house generator may be used in conjunction with the standard power source provided by the power company. Other solutions may include having the power company install multiple power feeds from separate power grids to help ensure that power is maintained. In other instances, a battery backup system may be provided such that when the power source fails, the battery backup system may provide power thereto.

A limitation of the battery backup approach is that typical batteries may only provide power to a computer system for a limited time. For some computer systems, a large battery or multiple batteries may be required to supply the necessary power. This limitation is further enhanced if the battery backup system is used in conjunction with a large data processing system which may draw a significant amount of power. For such large data processing systems, the duration of a battery source may be very limited, even if a number of batteries are provided in parallel. This may limit the number of instructions which a computer system may execute before the battery backup system also fails.

A typical system may download the data elements from the memory, through the host computer, and to the host disk storage system while powered by the secondary power source. In this configuration, the host computer, the memory, and the host disk storage system all have to be powered by the secondary power source to perform the download operation. That is, essentially the entire system has to be powered by the secondary power source to perform the download operation. As stated above, the secondary power source may be limited and therefore may not be capable of powering the entire computer system for a period of time that is sufficient to download all of the data elements that are stored in the memory. Further, for large data processing systems, there may be a number of hierarchical levels between the host computer and the memory. This may inhibit the speed at which the data elements may be downloaded from the memory to the host disk storage system.

Another limitation of prior art systems may be that since the host disk storage system stores the data base, there may not be enough disk space thereon to store all of the data in the memory. This is especially true since the data base may vary in size depending on various factors including data base usage. Therefore, it may be difficult to predict the free storage space that is available on the host disk storage system at any given time.

SUMMARY OF THE INVENTION

The present invention overcomes many of the disadvantages of the prior art by providing a computer system which may efficiently download critical data elements from a memory module to a data save disk system when a failure of a primary power source is detected. This may be accomplished by coupling the data save disk system directly to the memory module within the computer system such that the data elements that are stored in the memory module may be downloaded directly to the data save disk system, without requiring any intervention by a corresponding host computer. This configuration may have a number of advantages. First, the speed at which the data elements may be downloaded from the memory module to the data save disk system may be enhanced due to the direct coupling therebetween. Second, significant power savings may be realized because only the memory module and the data save disk system need to be powered by the secondary power source to effect the download operation. This may significantly increase the amount of time that the secondary power source may power the system thereby increasing the number of data elements that may be downloaded from the memory module.

As indicated above, an exemplary embodiment of the present invention may have a primary power source and a secondary power source. When the failure of the primary power source is detected, the computer system may be powered by the secondary power source. The primary power source may comprise a standard power line provided by a power company. The secondary power source may comprise a limited power source, like a battery. Typical batteries may provide power to a computer system for only a limited time. For some computer systems, a large battery or multiple batteries may be required to supply the necessary power. Further, because the power requirements of some computer systems are substantial, the duration of the battery source may be very limited. It is therefore essential that the critical data elements be downloaded to a disk storage system as expediently as possible.

In an exemplary embodiment, a high reliability computer system may comprise a host computer and a memory module. The host computer may be coupled to a host disk drive system for long term data storage. A data save disk system may be directly coupled to the memory module. Because the data save disk system is coupled directly to the memory module, and not through the host computer, the critical data elements stored in the memory module may be downloaded in a more expedient manner. This may allow all of the critical data elements stored in the memory module to be downloaded before the secondary power source fails.

In another embodiment of the present invention, the secondary power source may only power the memory module and the data save disk system. In this configuration, the remainder of the computer system, including the host computer, may not be powered after the primary power source fails. This may allow the secondary power source to remain active for a significantly longer period of time thereby allowing more data to be downloaded from the memory module. In this embodiment, the memory module may have circuitry to support the downloading of the critical data elements, without requiring any intervention by the host computer.

The memory module may comprise an outbound file cache. That is, the memory module may be used as a cache memory for the host computer. In this configuration, each of the transactions that is processed by the host computer may result in a number of intermediate data elements which may be stored in the outbound file cache. As processing continues, the intermediate data elements may be read from the outbound file cache and used to arrive at a final result. The final result may be written by the host computer to a host disk drive system.

Coupling the data save disk system directly to the outbound file cache rather than the host computer may have the same advantages as discussed above. That is, it may be faster to download the data elements directly from the outbound file cache to a data save disk system, rather than providing all of the data to the host computer and then to the host disk storage system. Further, significant power savings may be realized by powering only the outbound file cache and the data save disk system thereby allowing more data to be downloaded before the secondary power source fails. Finally, the data save disk system may be dedicated to storing the data elements in the outbound file cache and thus may be appropriately sized.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIGS. 10A–10B comprise a table illustrating an exemplary bus description of the DSD bus of FIG. 8;

FIGS. 18, 18A, and 18B comprise a flow diagram showing a fourth exemplary method of the present invention; and FIGS. 19, 19A, and 19B comprise a flow diagram showing a fifth exemplary method of the present invention.

DETAILED DESCRIPTION OF THE PREFERRED EMBODIMENTS

Figure 1:
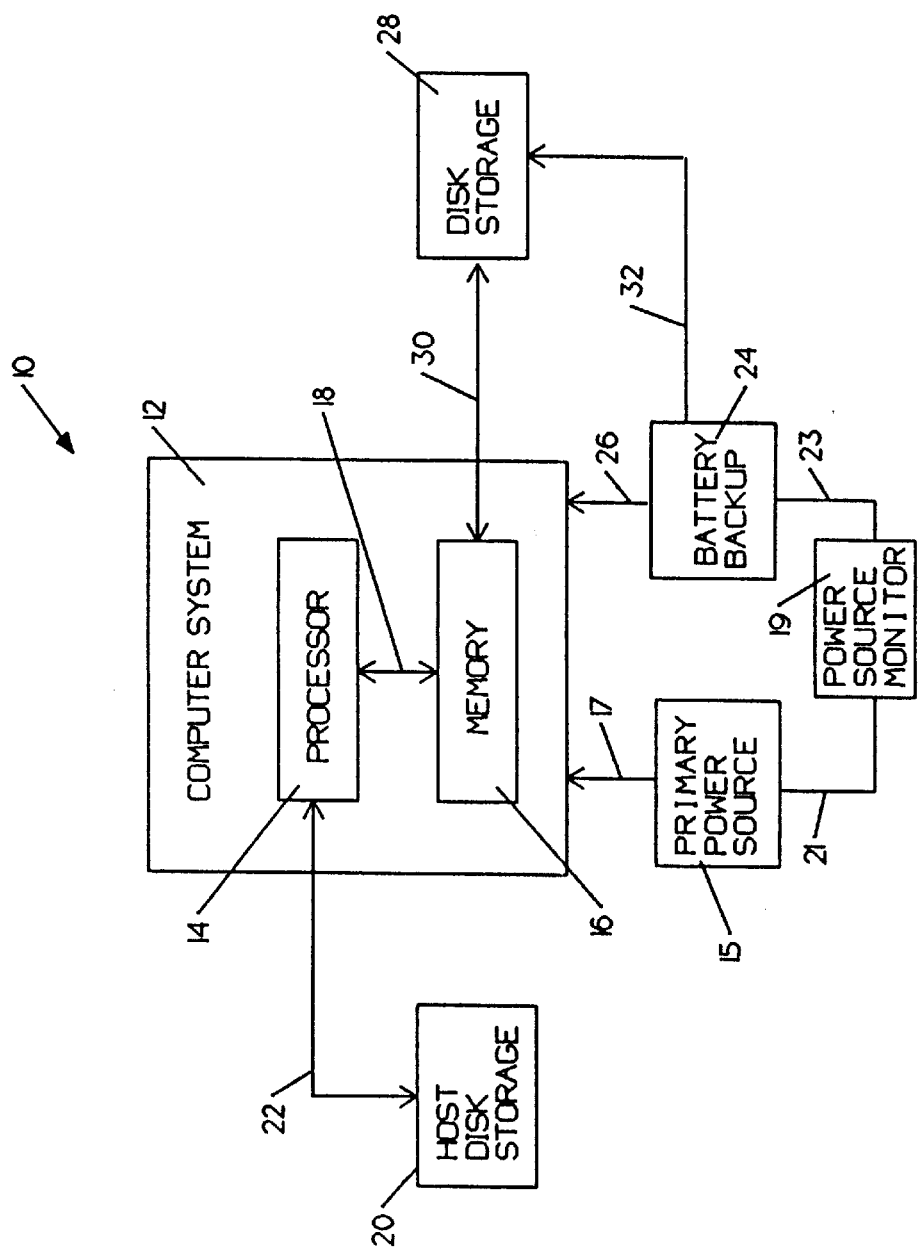
FIG. 1 is a block diagram of an exemplary embodiment of the present invention.

FIG. 1 is a block diagram of an exemplary embodiment of the present invention. The block diagram is generally shown at 10 and may comprise a computer system 12 having a processor 14 and a memory 16. Processor 14 may be coupled to memory 16 via interface 18. Computer system 12 may be coupled to a host disk storage system 20 via interface 22. Computer system 12 may read data from host disk storage 20 and perform operations thereon via processor 14. Processor 14 may store critical data elements in memory 16 via interface 18. Thereafter, processor 14 may read the critical data elements from memory 16 rather than from host disk storage 20, thereby significantly increasing the performance thereof. When processor 14 is done using the critical data elements, the critical data elements may be downloaded to host disk storage 20 wherein another portion of the data base may be read from host disk storage 20 and placed into memory 16. This process may be repeated any number of times as required by processor 14.

In an exemplary embodiment, computer system 12 may have a primary power supply 15 and a backup power supply 24. Computer system 12 may further have a memory 16 for storing intermediate data elements and a data save disk system 28 coupled thereto. When the primary power source 15 fails or otherwise becomes degraded, power source monitor 19 may detect such a failure or degradation via interface 21 and may activate backup power source 24 via interface 23 to power computer system 12. Power source monitor 19 may also have a recharge capability to recharge the backup power source 24.

The primary power source 15 may comprise a standard power line provided by a power company. Backup power source 24 may comprise a limited power source, like a battery. Typical batteries may provide power to a computer system for only a limited time. For some computer systems, a large battery or multiple batteries may be required to supply the necessary power. Further, because the power requirements of some computer systems are substantial, the duration of the battery source may be very limited. It is therefore essential that the critical data elements be downloaded to data save disk system 28 as expediently as possible.

As indicated above, computer system 12 may comprise a host processor 12 and a memory 16. Memory 16 may comprise a memory module which may be coupled directly to data save disk system 28 via interface 30. Host processor 14 may be coupled to a host disk storage 20 via interface 22 for long term data storage. Because data save disk system 28 may be coupled directly to memory module 16, and not through host processor 14, the critical data elements stored in memory module 16 may be downloaded in an expedient manner. This may allow all of the critical data elements stored in memory module 16 to be downloaded before backup power source 24 fails.

In another embodiment of the present invention, backup power source 24 may only power memory module 16 and data save disk system 28 via interfaces 26 and 32, respectively. In this configuration, the remainder of computer system 12, including host processor 14, may not be powered after primary power source 15 fails or is otherwise degradated. This may allow backup power source 24 to remain active for a significantly longer period of time thereby allowing more data to be downloaded from memory module 16. In this embodiment, memory module 16 may have circuitry to support the downloading of the critical data elements, without requiring any intervention by host processor 14.

Coupling data save disk system 28 directly to memory module 16 rather than host processor 14 may have significant advantages. As indicated above, it may be faster to download the data elements directly from memory module 16 to data save disk system 28, rather than providing all of the data to host processor 14 and then to host disk storage 20. Further, significant power savings may be realized by powering only memory module 16 and data save disk system 28 thereby allowing more data to be downloaded before backup power source 24 fails. Finally, data save disk system 28 may be dedicated to storing the data elements in memory module 16 and thus may be appropriately sized.

Figure 2:
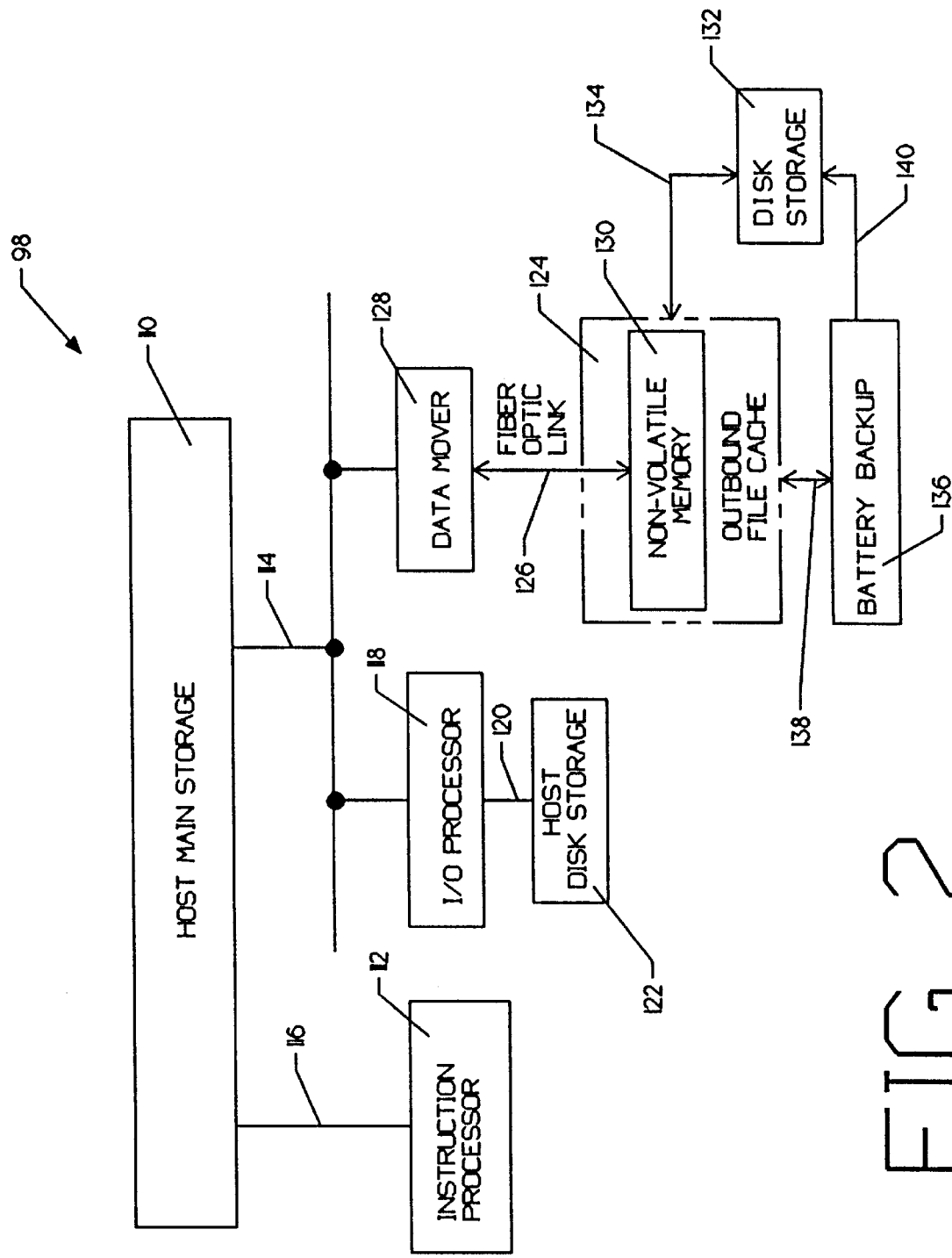
FIG. 2 is a block diagram of an exemplary computer system comprising an Extended Processor Complex (XPC) which employs the present invention.

FIG. 2 is a block diagram of an exemplary computer system comprising an Extended Processor Complex (XPC) which employs the present invention. The system is generally shown at 98. The XPC may comprise an instruction processor 112, an IO processor 118, a host disk storage 122, an Outbound File Cache (XIOP) 124, and a host main storage 110. Instruction processor 112 receives instructions from host main storage 110 via interface 116. Host main storage 110 is also coupled to MBUS 114. I/O processor 118 is coupled to MBUS 114 and is further coupled to host disk storage 122 via interface 120. The Outbound File Cache block 124 is also coupled to MBUS 114 through a data mover 128. Outbound File Cache block 124 may comprise a nonvolatile memory 130 wherein the data mover 128 may be coupled to nonvolatile memory 130 via fiber-optic link 126. The data is transferred from the host disk storage 122 through I/O processor 118 to host main storage 110. But now, any updates that occur in the data are stored in the Outbound File Cache 124 nonvolatile memory 130 instead of host disk storage 122, at least momentarily. All future references then access the data in nonvolatile memory 130. Therefore, the nonvolatile memory 130 may act like a cache for host disk storage 122 and may significantly increases data access speed. Only after the data is no longer being used by the system is it transferred back to host disk storage 122. Data mover 128 may be used to transmit data from host main storage 110 to nonvolatile memory 130 and vice versa. Only one data mover 128 is illustrated in FIG. 2. A more detailed discussion of the XPC system may be found in the above reference co-pending application, which has been incorporated herein by reference.

In accordance with the present invention, a data save disk system 132 may be coupled to outbound file cache 124 via interface 134. Outbound file cache 124 may have a primary power supply (not shown) and a backup power supply 136. When the primary power source fails, outbound file cache 124 may be powered by backup power source 136. The intermediate data elements stored in nonvolatile memory 130 may then be downloaded directly to the data save disk system 132 via interface 134. Note that data save disk system 132 may also be powered by backup power source 136 via interface 140. This configuration permits computer system 98 to detect a power failure, switch to backup power source 136, and store all of the critical data elements to data save disk system 132 before backup power source 136 also fails.

The primary power source may comprise a standard power line provided by a power company. Backup power source 136 may comprise a limited power source, like a battery. Typical batteries may provide power to a computer system for only a limited time. For some computer systems, a large battery or multiple batteries may be required to supply the necessary power. Further, because the power requirements of some computer systems are substantial, the duration of the battery source may be very limited. It is therefore essential that the critical data elements be downloaded to data save disk system 132 as expediently as possible.

In the exemplary embodiment, backup power source 136 may only power nonvolatile memory 130 and data save disk system 132 via interfaces 138 and 140, respectively. In this configuration, the remainder of computer system 98, including instruction processor 112, I/O processor 118, host main storage 510, and host disk storage 122, may not be powered after the primary power source fails. This may allow backup power source 136 to remain active for a significantly longer period of time thereby allowing more data to be downloaded from nonvolatile memory 130. In this embodiment, outbound file cache 124 may have circuitry to support the downloading of the critical data elements, without requiring any intervention by instruction processor 116 or I/O processor 118.

Coupling data save disk system 132 directly to outbound file cache 124 rather than instruction processor 112 or I/O processor 118 may have significant advantages. As indicated above, it may be faster to download the data elements directly from nonvolatile memory 130 to data save disk system 132, rather than providing all of the data to I/O processor 112 and then to host disk storage 122. Further, significant power savings may be realized by powering only outbound file cache 124 and data save disk system 132 thereby allowing more data to be downloaded before backup power source 136 fails. Finally, data save disk system 132 may be dedicated to storing the data elements in nonvolatile memory 130 and thus may be appropriately sized.

Figure 3:
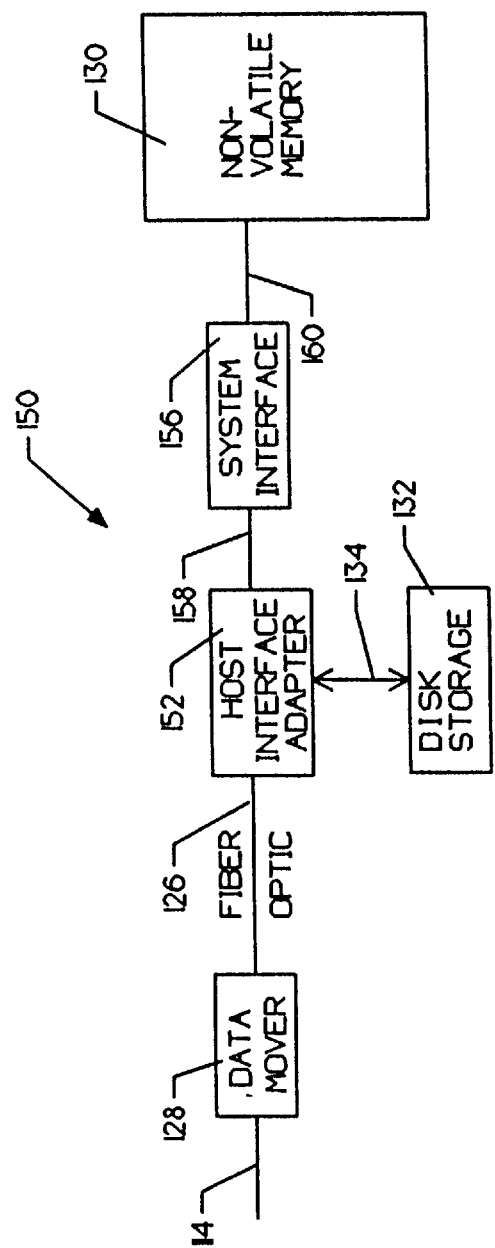
FIG. 3 is a block diagram of the Outbound File Cache block of the exemplary computer system shown in FIG. 2.

FIG. 3 is a block diagram of the Outbound File Cache block of the exemplary computer system shown in FIG. 2. The block diagram is generally shown at 150. Within Outbound File Cache block 124, additional components are required to interface with nonvolatile memory 130. These include host interface adaptor 152 and a system interface 156. Data mover 128 is coupled to MBUS 114 and further coupled to host interface adaptor 152 via fiber-optic interface 126. System interface 156 is coupled to host interface adaptor 152 via interface 158 and further coupled to nonvolatile memory 130 via interface 160. For every data mover 128 there is a host interface adaptor 152 and system interface 156 which is also added to the system. As more data movers 128 are added to the system, it becomes apparent that a bottle neck may occur in requests to nonvolatile memory 130. As a result, the size of nonvolatile memory 130 and the necessary bandwidth which is required to access this memory becomes a major performance concern. The XPC system alleviates this problem by allowing a plurality of nonvolatile memory elements 130 to be connected in parallel and further allowing each of the plurality of nonvolatile memory elements 130 to be accessed from each input port.

In accordance with the present invention, a data save disk system 132 may be coupled to host interface adapter 152 via interface 134. Host interface adapter 152 may contain circuitry to perform a download operation of the data elements in nonvolatile memory 130 to data save disk system 132 without any intervention by a host computer or an instruction processor. In an exemplary embodiment, each host interface adapter 152 may have a corresponding data save disk system 132. However, it is contemplated that only a portion of the host interface adapters 152 in the system may have a corresponding data save disk system 132. Preferably, there are at least two data save disk systems 132 for each nonvolatile memory 130 to provided redundancy and thus reliability thereto.

Figure 4:
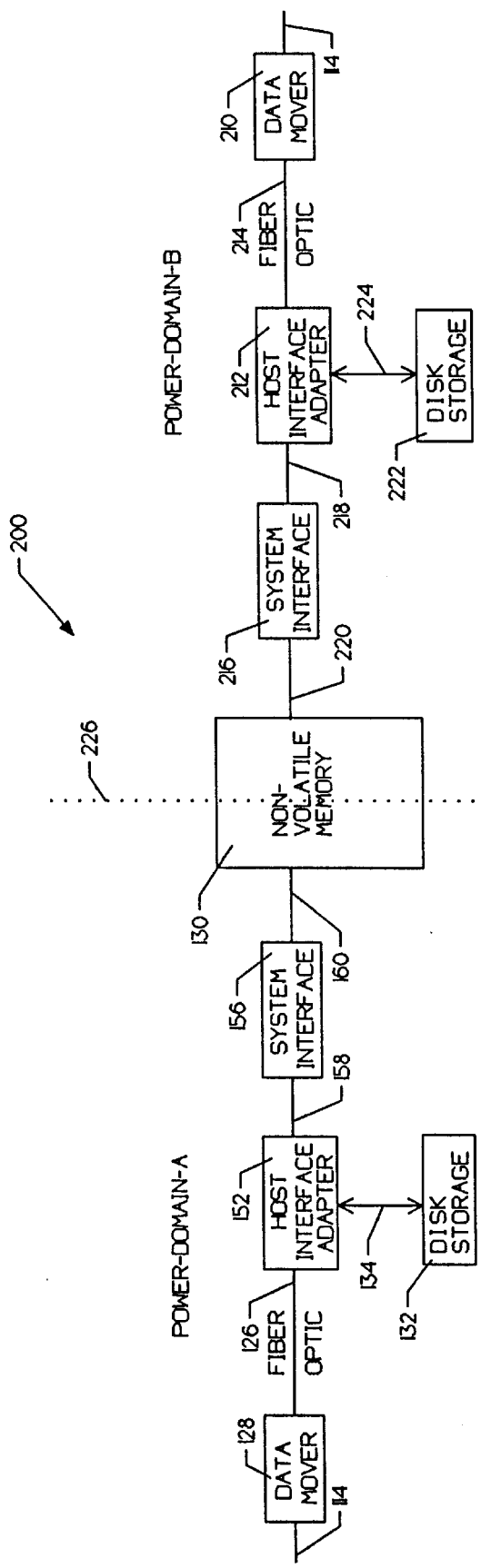
FIG. 4 is a block diagram of two outbound file cache blocks accessing a single nonvolatile memory wherein each of the outbound file cache blocks are in a separate power domain.

FIG. 4 is a block diagram of two outbound file cache blocks accessing a single nonvolatile memory wherein each of the outbound file cache blocks are in a separate power domain. The block diagram is generally shown at 200. Data mover 128 is coupled to MBUS 114 and further coupled to host interface adaptor 152 via fiber-optic interface 126. System interface 156 is coupled to host interface adaptor 152 via interface 158 and further coupled to nonvolatile memory 130 via interface 160. Data save disk system 132 is coupled to host interface adapter 152 via interface 134 and may operate as described above. Host interface adapter 152, data save disk system 132, and system interface 156 are all within a power domain-A. Power domain-A may have a primary power source and a secondary power source, as described above.

Similarly, data mover 210 is coupled to MBUS 114 and further coupled to host interface adaptor 212 via fiber-optic interface 214. System interface 216 is coupled to host interface adaptor 212 via interface 218 and further coupled to nonvolatile memory 130 via interface 220. Data save disk system 222 is coupled to host interface adapter 212 via interface 224. Host interface adapter 212, data save disk system 222, and system interface 216 may all be within a power domain-B. Power domain-A and power domain-B are separate power domains as indicated by line 226. This provides redundancy to the system and may add reliability thereto.

Non-volatile memory 130 may be in both power domain-A and power domain-B such that nonvolatile memory may function when either power supply is active. In an exemplary embodiment, nonvolatile memory 130 may have a first portion and a second portion wherein the first portion is in power domain-A and the second portion is in power domain-B. Power domain-B may have a primary power source and a secondary power source, as described above. When a data element is written to nonvolatile memory 130, the data element may be written to both the first portion and the second portion thereby creating a copy of the data element in power domain-A and another copy in power domain-B.

Figure 5:
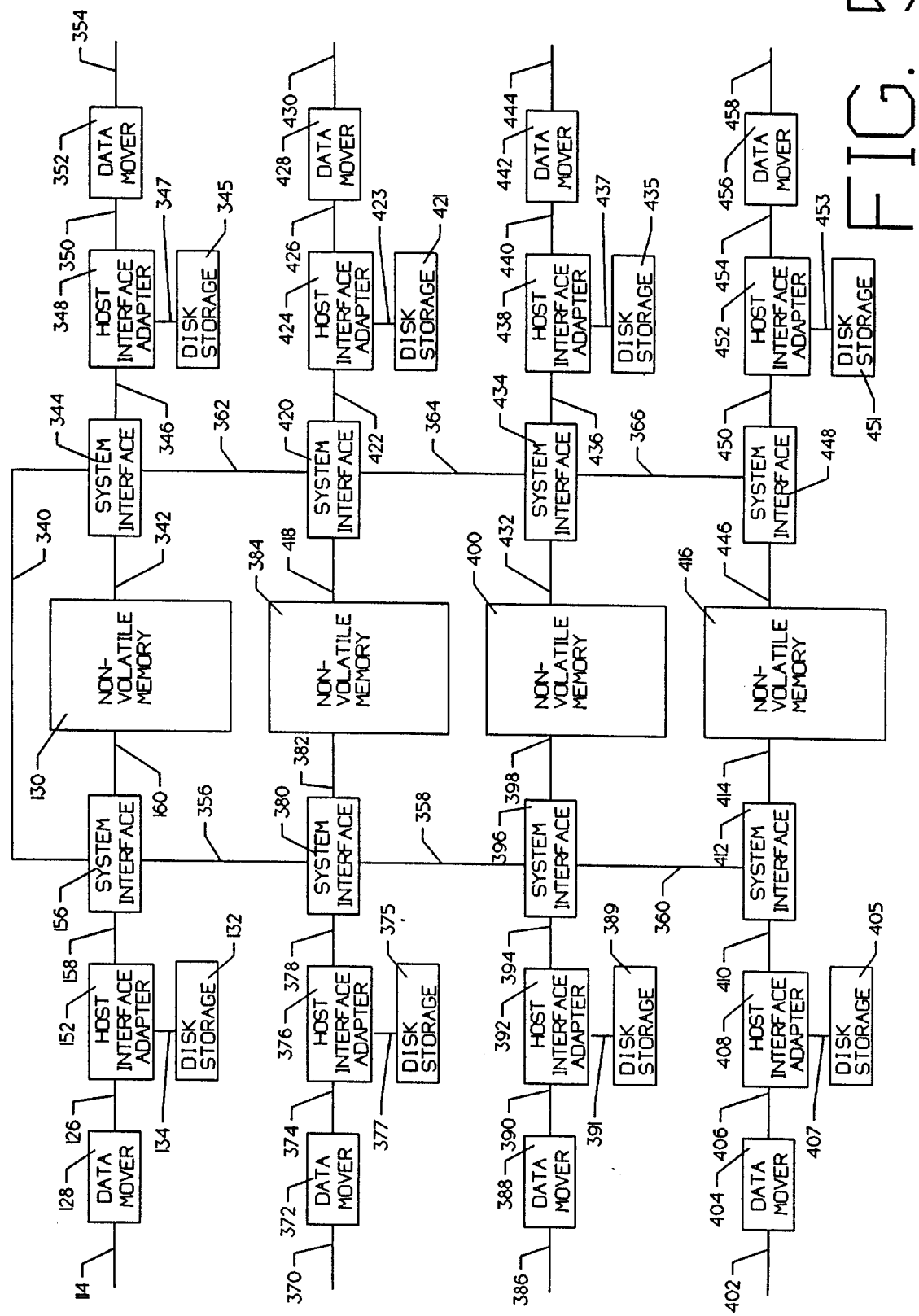
FIG. 5 is a block diagram of the interconnect of Outbound File Cache blocks of an exemplary computer system employing a street architecture.

FIG. 5 is a block diagram of the interconnect of Outbound File Cache blocks of an exemplary computer system employing a street architecture. The street architecture is a network of interconnecting system interface cards (SIF) that allow requesters on one SIF card to travel to another SIF card to access the nonvolatile memory (the System Interface Cards are indicated on FIG. 5 via reference numerals 156, 380, 396, 412, 344, 420, 434 and 448). Each nonvolatile memory 130, 384, 400 and 416 is independent from the others. However, any nonvolatile memory block can be accessed by any SIF by way of the streets 340, 356, 358, 360, 362, 364, and 366.

Data movers 128, 372, 388 and 404 are coupled to input ports 114, 370, 386 and 402, respectively. Similarly data movers 352, 428, 442 and 456 are coupled to input ports 354, 430, 444 and 458, respectively. Host interface adaptor 152 is coupled to data mover 128 via fiber-optic interface 126 and further coupled to system interface 156 via interface 158. Host interface adaptor 376 is coupled to data mover 372 via fiber-optic interface 374 and further coupled to system interface 380 via interface 378. Host interface adaptor 392 is coupled to data mover 388 via fiber-optic interface 390 and further coupled to system interface 396 via interface 394. Host interface adaptor 408 is coupled to data mover 404 via fiber-optic interface 406 and further coupled to system interface 412 via interface 410. Host interface adaptor 348 is coupled to data mover 352 via fiber-optic interface 350 and further coupled to system interface 344 via interface 346. Host interface adaptor 424 is coupled to data mover 428 via fiber-optic interface 426 and further coupled to system interface 420 via interface 422. Host interface adaptor 438 is coupled to data mover 442 via fiber-optic interface 440 and further coupled to system interface 434 via interface 436. Host interface adaptor 452 is coupled to data mover 456 via fiber-optic interface 454 and further coupled to system interface 448 via interface 450.

Nonvolatile memory 130 is coupled to system interface 156 via interface 160 and further coupled to system interface 344 via interface 342. Nonvolatile memory 384 is coupled to system interface 380 via interface 382 and further coupled to system interface 420 via interface 418. Nonvolatile memory 400 is coupled to system interface 396 via interface 398 and further coupled to system interface 434 via interface 432. Nonvolatile memory 416 is coupled to system interface 412 via interface 414 and further coupled to system interface 448 via interface 446.

System interface 396 is coupled to system interface 412 via interface 360 and further coupled to system interface 380 via interface 358. System interface 336 is coupled to system interface 380 via interface 356 and further coupled to system interface 344 via interface 340. System interface 420 is coupled to system interface 344 via interface 362 and further coupled to system interface 434 via interface 364. Finally, system interface 448 is coupled to system interface 434 via interface 366.

In accordance with the present invention, data save disk systems 132, 375, 389, 405, 345, 421, 435, and 452 may be coupled to host interface adapters 152, 376, 392, 408, 348, 424, 438, and 152 via interfaces 134, 377, 391, 407, 347, 423, 437, and 453, respectively. However, it is contemplated that only a portion of the host interface adapters 152, 376, 392, 408, 348, 424, 438, and 452 in the system may have a corresponding data save disk system. Preferably, there are at least two data save disk systems for each nonvolatile memory 130, 384, 400, and 416 to provide redundancy and thus reliability. Host interface adapters 152, 376, 392, 408, 348, 424, 438, and 452 may contain circuitry to perform a download operation of the data elements in nonvolatile memories 130, 384, 400, and 416 to data save disk systems 132, 375, 389, 405, 345, 421, 435, and 452, without any intervention by a host computer or instruction processor.

Interfaces 360, 358, 356, 340, 362, 364 and 366 represent the streets within the street architecture. Note that the nonvolatile memories 130, 384, 400 and 416 are distributed among the system interface cards 156, 380, 396, 412, 344, 420, 434 and 448. Each system interface card has its own local memory but may access any of the other nonvolatile memories 130, 384, 400 and 416 by taking the appropriate street to the particular nonvolatile memory.

Although similar to the embodiment shown in FIG. 4, the structure depicted in FIG. 5 is in an "A" power domain except for the data movers 128, 372, 388, 404, 352, 428, 442 and 456. A power domain is defined as the portion of a system that is driven by a particular group of power supplies. In the preferred embodiment, each power domain has two power supplies connected to two different AC entrances. For resilient purposes, the Outboard File Cache has two power domains, namely "A" and "B", as discussed above.

In the preferred embodiment, there is a redundant structure, identical to that contained in FIG. 5 (but not shown in FIG. 5), that is connected to a "B" power domain. Each nonvolatile memory 130, 384, 400, 416 then has two paths from data movers 128, 372, 388, 404, 352, 428, 442 and 456 that are in the "A" power domain and two paths from data movers 128, 372, 388, 404, 352, 428, 442 and 456 that are in "B" power domain (For example nonvolatile memory 130 has paths to Data Mover 128 and Data Mover 352 in the "A" power domain. Non volatile memory 130 also has paths to the same Data Movers in a "B" power domain. This embodiment may be preferred when high levels of reliability are required.

Figure 6:
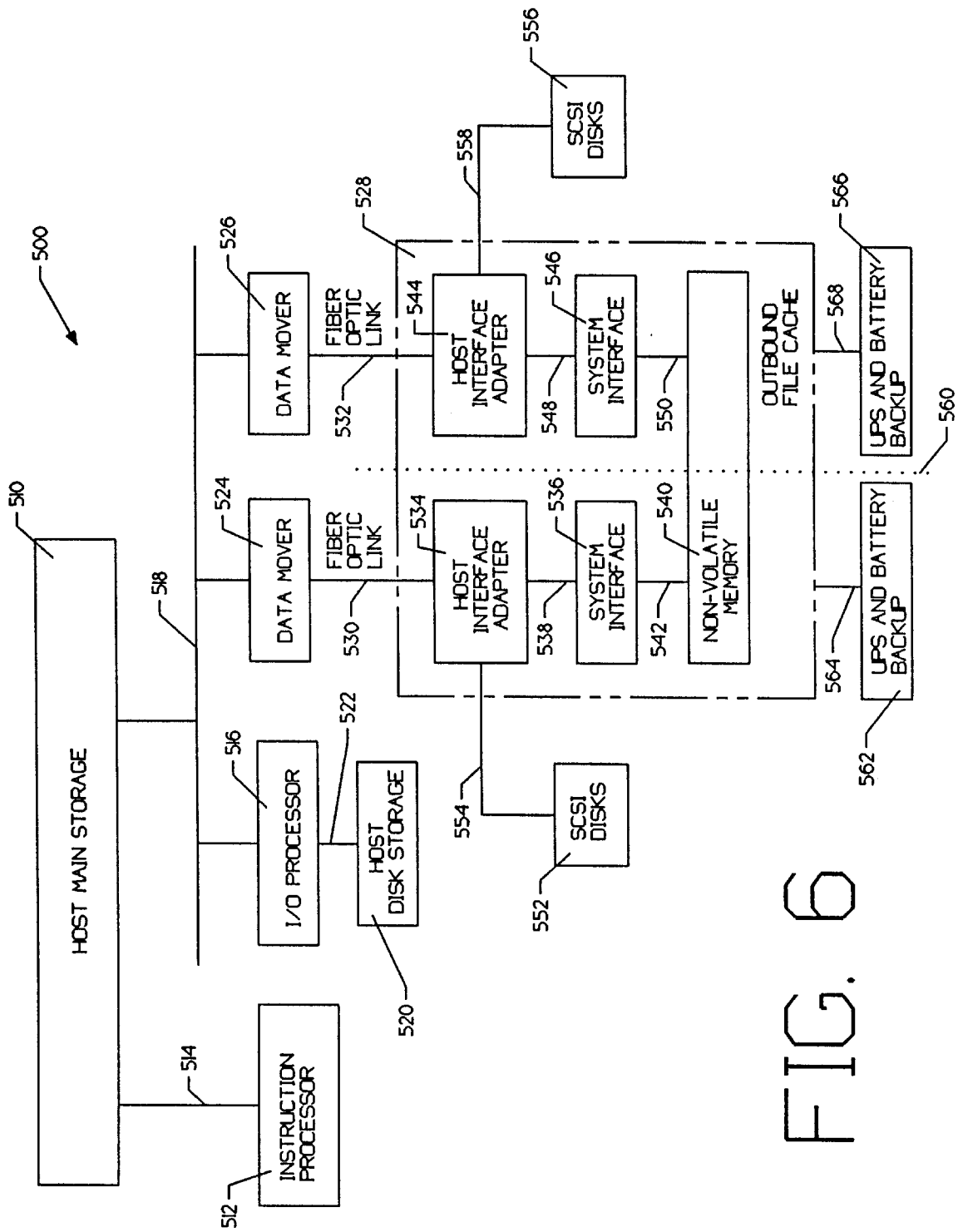
FIG. 6 is a block diagram of the exemplary computer system highlighting the two power domains provided in the preferred embodiment of the outbound file cache block.

FIG. 6 is a block diagram of the exemplary computer system highlighting the two power domains provided in a preferred embodiment of the outbound file cache block 528. The block diagram is generally shown at 500. For simplification, the block diagram contains the embodiment of the outbound file cache shown in FIG. 4 rather than the more complex embodiment shown in FIG. 5. This may provide a clearer understanding of the present invention without getting into unnecessary system details. As indicated above, the XPC comprises an instruction processor 512, an IO processor 516, a host disk storage 520, an outbound File Cache block 528, and a host main storage 510. Instruction processor 512 receives instructions from host main storage 510 via interface 514. Host main storage 510 is also coupled to MBUS 518. I/O processor 516 is coupled to MBUS 518 and is further coupled to host disk storage 520 via interface 522. In the exemplary embodiment, outbound File Cache block 528 is coupled to MBUS 518 through a first data mover 524 and a second data mover 526. Outbound File Cache block 528 may comprise two separate power domains including a power domain-A powered by a universal power source (UPS) and battery backup power source 562 via interface 564, and a power domain-B powered by a UPS power source and battery backup power source 566 via interface 568. The separation of power domain-A and power domain-B is indicated by line 560. UPS and battery backup blocks 562 and 566 may have a detection means therein to detect when a corresponding primary power source fails or becomes otherwise degradated.

Power domain-A of outbound file cache 528 may comprise a host interface adapter 534, a system interface block 536, and a portion of a nonvolatile memory 540. Host interface adapter 534 may be coupled to data mover 524 via fiber optic link 530 and may further be coupled to system interface block 536 via interface 538. System interface block 536 may be coupled to nonvolatile memory 540 via interface 542, as described above. Similarly, host interface adapter 544 may be coupled to data mover 526 via fiber optic link 532 and may further be coupled to system interface block 546 via interface 548. System interface block 546 may be coupled to nonvolatile memory 540 via interface 550, as described above.

The data may be transferred from the host disk storage 520 through I/O processor 516 to host main storage 510. But now, any updates that occur in the data are stored in nonvolatile memory 540 instead of host disk storage 520, at least momentarily. All future references then access the data in nonvolatile memory 540. Therefore, nonvolatile memory 540 acts like a cache for host disk storage 520 and may significantly increases data access speed. Only after the data is no longer needed by the system is it transferred back to host disk storage 520. Data movers 524 and 526 are used to transmit data from the host main storage 510 to the nonvolatile memory 540 and vice versa. In the exemplary embodiment, data movers 524 and 526 perform identical cache functions thereby increasing the reliability of the overall system. A more detailed discussion of the XPC system may be found in the above reference co-pending application, which has been incorporated herein by reference.

In accordance with the present invention, a data save disk system 552 may be coupled to host interface adapter 534 via interface 554. Similarly, data save disk system 556 may be coupled to host interface adapter 544 via interface 558. Data save disk systems 552 and 556 may comprise SCSI type disk drives and host interface adapters 534 and 544, respectively, may provide a SCSI interface thereto. In this configuration, the data elements stored in nonvolatile memory 540 may be downloaded directly to the data save disk systems 552 and 556. This may permit computer system 500 to detect a power failure in a power domain, switch to a corresponding backup power source 562 or 566, and store all of the critical data elements stored in nonvolatile memory 540 on SCSI disk drives 552 or 556 before the corresponding backup power source 562 or 566 also fails.

The primary power sources may comprise a universal power source (UPS) available from the assignee of the present invention. The backup power sources may comprise a limited power source, like a battery. Typical batteries may provide power to a computer system for only a limited time. For some computer systems, a large battery or multiple batteries may be required to supply the necessary power. Further, because the power requirements of some computer systems are substantial, the duration of the battery source may be very limited. It is therefore essential that the critical data elements be downloaded to a corresponding data save disk system 552 or 556 as expediently as possible.

In the exemplary embodiment, backup power source 562 may only power a first portion of nonvolatile memory 540, host interface adapter 534, system interface 536, and data save disk system 552. Similarly, backup power source 566 may only power a second portion of nonvolatile memory 540, host interface adapter 544, system interface 546, and data save disk system 556. In this configuration, the remainder of computer system 500, including instruction processor 512, I/O processor 516, host main storage 510, and host disk storage 520, may not be powered after the primary power source fails. This may allow backup power sources 562 and 566 to remain active for a significantly longer period of time thereby allowing more data to be downloaded from nonvolatile memory 540. In this embodiment, host interface adapters 534 and 544 may have circuitry to support the downloading of the critical data elements to the SCSI disk drives 552 and 556, without requiring any intervention by instruction processor 512 or I/O processor 516.

Coupling data save disk systems 552 and 556 directly to host interface adapters 534 and 544, respectively, rather than to instruction processor 512 or I/O processor 516 may have significant advantages. As indicated above, it may be faster to download the data elements directly from nonvolatile memory 540 to data save disk systems 552 or 556, rather than providing all of the data to I/O processor 516 and then to host disk storage 520. Further, significant power savings may be realized by powering only the blocks in outbound file cache 528 and the corresponding data save disk systems 552 or 556, thereby allowing more data to be downloaded before a corresponding backup power source 562 or 566 fails. Finally, data save disk systems 552 and 556 may be dedicated to storing the data elements in nonvolatile memory 540 and thus may be appropriately sized.

In a preferred mode, once the data save operation has begun, it continues until all of the data in nonvolatile memory 540 has been transferred to the data save disk system. Thereafter, the data save disks are spun down and the outbound file cache 528 is powered down to minimize further drain on the battery backup power source. If the primary power source comes back on during the data save operation, the data save is still completed, but the outbound file cache 528 is not powered down. When primary power is restored, the operation of computer system 500 may be resumed beginning with a data restore operation, but only after the battery backup power source has been recharged to a level which could sustain another primary power source failure.

The data restore operation occurs after normal computer system 500 initialization, including power-up, firmware load, etc. However, before a data restore operation is allowed to begin, the presence of saved data on a corresponding data save disk must be detected. Prior to initiating the data restore operation, the USBC microcode (see FIG. 7) compares the present computer system 500 configuration with the configuration that was present when the data save operation was executed. If the two configurations are not an exact match, the data restore operation is not executed and an error is indicated.

A data save disk set may be added to the outbound file cache 528 as a single or redundant configuration. A single data save set may save one copy of the nonvolatile memory 540 contents, and is used when there is only one Universal Power Source (UPS) 562 driving the outbound file cache 528 and data save disks. A redundant data save disk configuration may have two data save disk sets (as shown in FIG. 6) and may save two copies of the nonvolatile memory contents. In the redundant configuration, one set of data save disk drives may be powered from one UPS while the another set of data save disk drives may be powered by another UPS.

Figure 7:
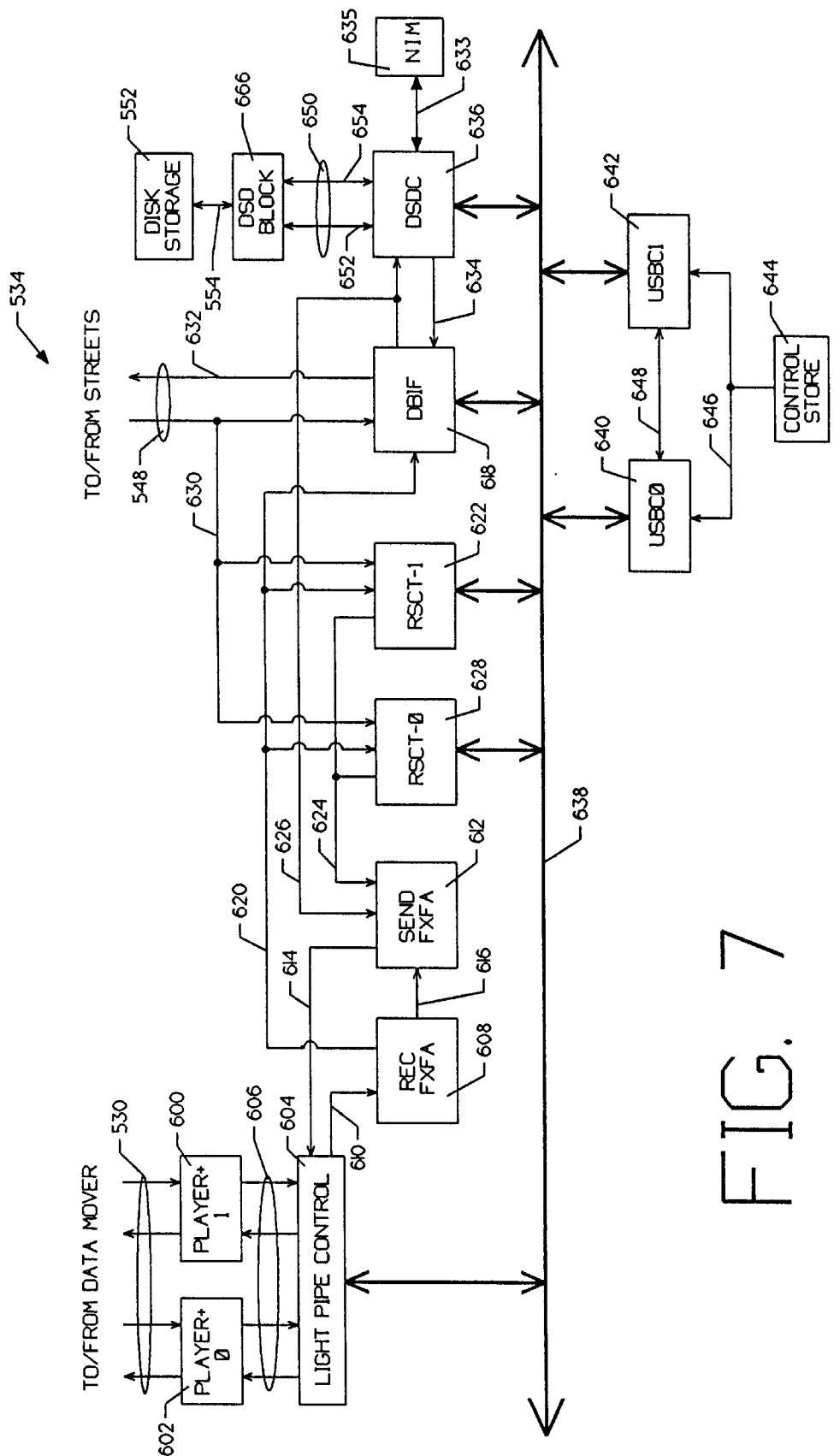
FIG. 7 is a schematic diagram of an exemplary embodiment of the host interface adapter block.

FIG. 7 is a schematic diagram of an exemplary embodiment of the host interface adapter block. For illustration, Host Interface Adapter (HIA) 534 of FIG. 6 is shown. It is recognized that HIA 544 may be similarly constructed. HIA 534 may comprise two Microsequencer Bus Controllers (USBC) 640, 642 which may be connected to a control store 644 via interface 646. The USBC's 640, 642 may access the HIA stations 628, 622, 618, and 636 via a micro bus 638. A player+0 602 and a player+1 600 may receive frames (or data elements) over fiber optic link 530. The term player+ refers to a fiber optic interface controller available from National Semiconductor which is called the Player Plus Chip Set. Player+0 602 may forward its frame to light pipe control 604 via interface 606. Similarly, player+1 600 may forward its frame to light pipe control 604 via interface 606. Light pipe control 604 may transfer the frames to a Receive Frame Transfer Facility (REC FXFA) 608 via interface 610. REC FXFA 608 may unpack the frames and may store control information in a Request Status Control Table-0 (RSCT-0) 628 and a RSCT-1 622 via interface 620. RSCT-0 628 and RSCT-1 622 may monitor the data that has been received from a corresponding data mover. The data which was contained in the frame received by REC FXFA 608 may be sent to the Database Interface (DBIF) station 618 via interface 620. DBIF 618 may forward the data over interface 632 to the streets, which are discussed with reference to FIG. 5.

Data received by the DBIF 618 from the streets via interface 548, may be sent to the Send Frame Transfer Facility (SEND FXFA) 612 via interface 626. Control information received via interface 630 may be sent to RSCT-0 628 and RSCT-1 622. SEND FXFA 612 may take the data and the control information provided by RSCT-0 628 and RSCT-1 622 via interface 624, and format a frame for transmission by light pipe control 604. Acknowledgements from REC FXFA 608 may be provided to SEND FXFA 612 via interface 616. The frame may be forwarded to light pipe control 604 via interface 614. Light pipe control 604 may create two copies of the frame received by SEND FXFA 612, and may provided a first copy to player+0 602 and a second copy to player+1 600 via interface 606. The frames may then be transmitted over the fiber optic links 530 to a corresponding data mover.

Referring back to control store 644, control store 644 may be used to store the instructions that are executed by USBC0 640 and USBC1 642. Control store 644, although in reality a RAM, is used as a read-only memory (ROM) during normal operation. Control store 644 may comprise seven (7) SRAM devices (not shown). Each SRAM device may hold 32*1024 (K) 8-bit bytes of data. Each unit of data stored in control store 644 may comprise 44 bits of instruction, 8 bits of parity for the instruction, and 2 bits of address parity.

Control store 644 may be loaded with instructions at system initialization by a support computer system through a maintenance path (not shown). The parity bits and address bits are computed by a host computer system and appended to each instruction as it is stored. Later, as USBC0 640 and USBC1 642 read and execute the instructions, each instruction is fetched from control store 644 and parity values are computed from it. Each USBC compares the parity values computed against the parity checks stored in control store 644. If there are any discrepancies, control store 644 is assumed to be corrupted and an internal check condition is raised in the corresponding USBC's.

USBC0 640 and USBC1 642 are special purpose microprocessors that execute instructions to monitor and control the transfer of data on micro bus 638. There are two USBC's in the system to ensure that all data manipulations are verified with duplex checking. One of the USBC's 640 is considered to be the master while the other USBC1 642 is considered the slave. Only the master USBC0 640 drives the data on the micro bus 638, but both master USBC0 640 and slave USBC1 642 drive address and control signals to lower the loading on micro bus 638. The slave USBC1 642 may send the result of each instruction to the master USBC0 640 via interface 648. The master USBC0 640 may then compare this value to the result it computed. If the values are different, an internal check error condition is set and the program is aborted. A further discussion of the operation of HIA 534 may be found in the above referenced co-pending application, which is incorporated herein by reference.

In accordance with the present invention, a data save disk controller (DSDC) 636 may be coupled to micro bus 638 and may thus communicate with USBC0 640 and USBC1 642. DSDC 636 is further coupled to DBIF 618 via interfaces 634 and 626. DSDC may receive data elements from DBIF 618 via interface 626 and may provide data elements to DBIF 618 via interface 634. DSDC 636 is further coupled to a DSD block 666 via a DSD bus 650. In the exemplary embodiment, DSDC 636 may be coupled to DSD block 666 via a DSD address bus 652, a DSD data bus 654, and a number of control signals. DSD block 666 may be coupled to a data save disk system 552 via interface 554. DSD block may provide the interface function between DSDC 636 and data save disk system 552. A network interface module (NIM) 635 may be coupled to DSDC 636 via interface 633. NIM 635 may provide maintenance functions to DSDC 636, and to other elements within the system. USBC0 640 and USBC1 642 may control the operation of a download and/or upload operation between a nonvolatile memory 540 and data save disk system 552. This may include providing a timer function to delay the download and/or upload operation for a predetermined time period.

In this configuration, data save disk system 552 is directly coupled to nonvolatile memory 540 via DSD block 666, DSDC 636, DBIF 618, and system interface 536 (see FIG. 6). When a primary power source fails, the data elements stored in nonvolatile memory 540 may be downloaded directly to the data save disk system 552 without any intervention by an instruction processor 512 or I/O processor 516. This configuration may have a number of advantages. First, the speed at which the data elements may be downloaded from nonvolatile memory 540 to data save disk system 552 may be enhanced due to the direct coupling therebetween. Second, significant power savings may be realized because only HIA 534, data save disk system 552, system interface 536, and non-volatile memory 540 need to be powered by the secondary power source to effect the download operation. This may significantly increase the amount of time that the secondary power source may power the system thereby increasing the number of data elements that can be downloaded.

Similarly, once the primary power source is restored, data save disk system 552 may upload the data elements directly to nonvolatile memory via DSD block 666, DSDC 636, DBIF 618, and system interface block 536, without any assistance from an instruction processor 512 or I/O processor 516. This may provide a high speed upload link between data save disk system 552 and nonvolatile memory 540.

Figure 8:
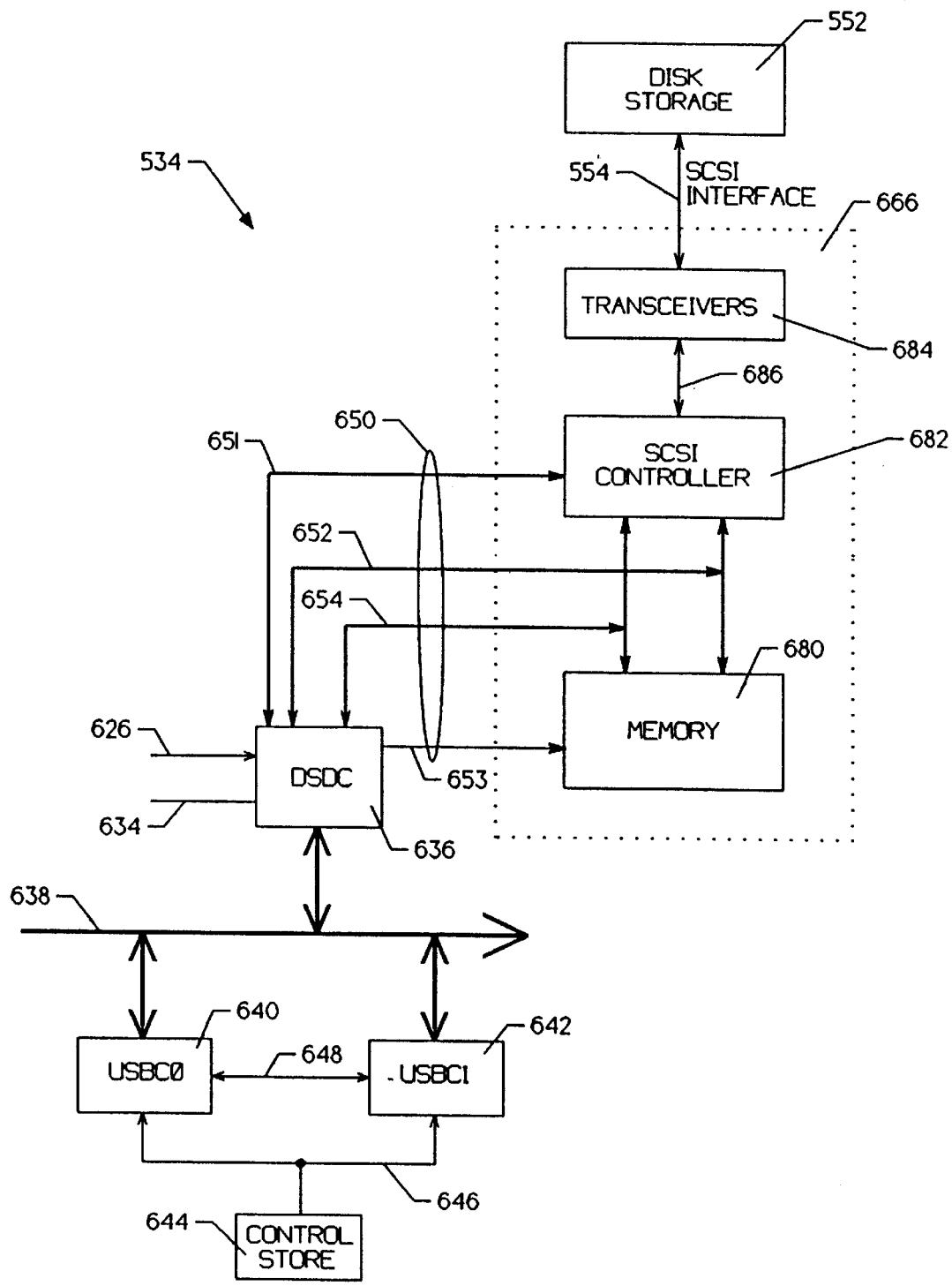
FIG. 8 is a partial schematic diagram of the host interface adapter block detailing the data save disk interface.

FIG. 8 is a partial schematic diagram of the host interface adapter block detailing the data save disk interface. DSD block 666 may comprise a memory 680, a disk controller 682, and a set of transceivers 684. A DSD bus 650 may couple DSDC 636, memory 680, and disk controller 682, and may comprise an address bus 652, and a data bus 654. DSD bus 650 may further comprise a number of disk controller control signals 651, and a number of memory control signals 653. DSD bus 650 may operate generally in accordance with a standard master/slave bus protocol wherein the DSDC 636, disk controller 682, and memory 680 may be slave devices, but only DSDC 636 and disk controller 682 may be master devices. That is, memory 680 may not be a master device in the exemplary embodiment.

Disk controller 682 may be coupled to transceivers 684 via interface 686. Transceivers 684 may be coupled to data save disk system 552 via interface 554. In a preferred mode, interface 554 may be a SCSI interface. Disk controller 682 may be a SCSI disk controller and data save disk storage system 552 may comprise at least one SCSI disk drive. In a preferred embodiment, disk controller 682 may be a NCR53C720 SCSI I/O Processor currently available from NCR corporation. Further, the at least one SCSI disk drives of data save disk storage 552 may comprise Hewlett Packard C3010 5.25" drives, Fijitsu M2654 5.25" drives, or Seagate ST12550/ND 3.5" drives. The data save disk system may comprise a set of 2-GByte SCSI Disks in sufficient quantity to store a single copy of the entire contents of the XPC. The NCR I/O processor may provide the necessary SCSI interface between DSDC 636 and the at least one disk drives of data save disk system 552.

As indicated with reference to FIG. 7, USBC0 640 and USBC1 642 may be coupled to MBUS 638. Further, USBC0 640 and USBC1 642 may be coupled to control store 644 via interface 646. DSDC 636 may be coupled to micro bus 638, DBIF 618, and DSD block 666.

Memory 680 may comprise at least one RAM device. In a preferred mode, memory 680 comprises four RAM devices. Because the disk storage system is an addition to an existing HIA design, control store 644 may not have enough memory locations to store the added pointers and temporary data needed to support the data save disk function. Therefore, a primary function of memory 680 is to store the pointers and temporary data for USBC0 640 and USBC1 642 such that HIA 534 may support the disk data save function. Another primary function of memory 680 is to store SCRIPTS for disk controller 682. SCRIPT programs and the application thereof are discussed in more detail below. Additions to the USBC microcode which may be stored in memory 680 may provide the following functionality: (1) initialization of the data save disk system 552 and microcode control areas; (2) data save operation which may copy all of the data and control elements from nonvolatile memory 540 to data save disk system 552; (3) data restore operation which may copy all of the data and control elements from data save disk system 552 to nonvolatile memory 540; (4) checking the status of the disks in data save disk storage system 552 and informing maintenance if restore data exists thereon; and (5) various error detection and error handling subroutines.

As indicated above, USBC0 640 and USBC1 642 may read pointers and/or temporary data or the like from memory 680 through DSDC 636. To accomplish this, USBC0 640 and USBC1 642 may provide an address to DSDC 636 wherein DSDC 636 may arbitrate and obtain control of DSD bus 650. Once this has occurred, DSDC 636 may provide the address to memory 680. Memory 680 may then read the corresponding address location and provide the contents thereof back to DSDC 636 via DSD bus 650. DSDC 636 may then provide the pointers and/or temporary data or the like to USBC0 640 and USBC1 642 for processing. By using this protocol, USBC0 640 and USBC1 642 may obtain pointers and/or temporary data from memory 680 to control the operation of a download and/or upload operation between nonvolatile memory 540 and data save disk system 552. This may include providing a timer function to delay the download and/or upload operation for a predetermined time period.

Data save disk system 552 is directly coupled to nonvolatile memory 540 via DSD block 666, DSDC 636, DBIF 618, and system interface 536 (see FIG. 6). When a primary power source fails, and under the control of USBC0 640 and USBC1 642, DBIF 618 may read the data elements from nonvolatile memory via interface 630 wherein DBIF 618 may provide the data elements to DSDC 636 via interface 626. DSDC 636 may then perform arbitration for DSD bus 650, wherein the data elements may be read by disk controller 682. In this instance, disk controller 682 may be the bus master. Disk controller 682 may then provide the data elements to transceivers 684 wherein the data elements may be written to data save disk system 552. This configuration may have a number of advantages. First, the speed at which the data elements may be downloaded from nonvolatile memory 540 to data save disk system 552 may be enhanced due to the direct coupling therebetween. Second, significant power savings may be realized because only HIA 534, system interface 536, non-volatile memory 540, and data save disk system 552 need to be powered by the secondary power source to effect the download operation. This may significantly increase the amount of time that the secondary power source may power the system thereby increasing the number of data elements that may be downloaded.

Similarly, once the primary power source is restored, data save disk system 552 may upload the data elements directly to nonvolatile memory via DSD block 666, DSDC 636, DBIF 618, and system interface block 536, without any assistance from an instruction processor 512 or I/O processor 514. This may provide a high speed upload link between data save disk system 552 and nonvolatile memory 540.

Figure 9A:
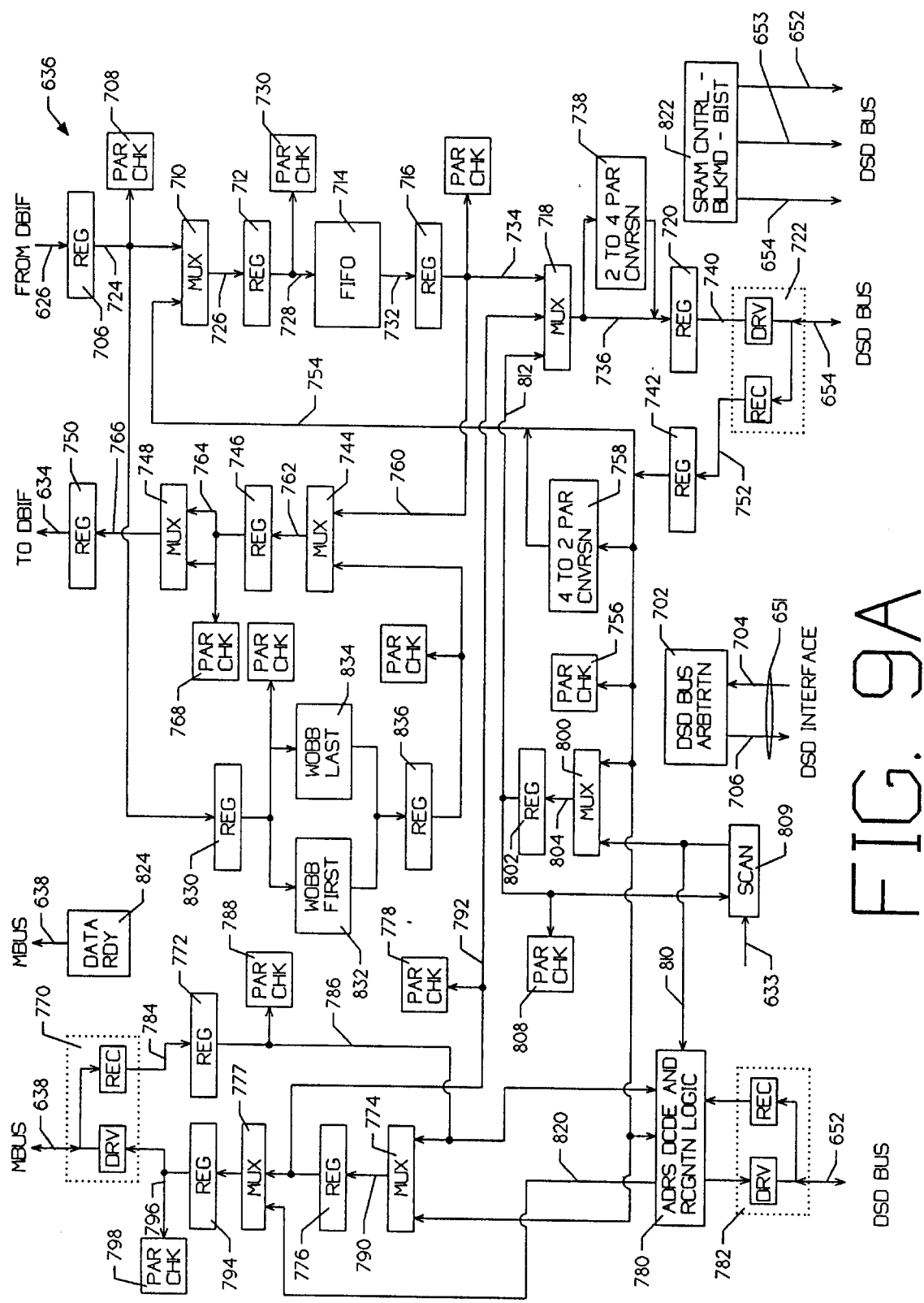
FIG. 9A is a block diagram of the Data Save Disk Chip (DSDC) shown in FIGS. 7–8.

FIG. 9A is a block diagram of the Data Save Disk Controller (DSDC) shown in FIGS. 7–8. The block diagram is generally shown at 636. DSDC 636 may comprise a DSD bus arbitration and control block 702 which may control the arbitration of DSD bus 650. DSD bus arbitration and control 702 may determine which device may assume the role of bus master of DSD bus 650. Preemptive priority is used to determine which device becomes bus master when more than one device is requesting bus mastership at any given time. In the exemplary embodiment, the priority order of bus mastership, from high priority to low priority, may be as follows: disk controller 682, USBC blocks 640, 642, and finally network interface module (NIM) 635. Memory 680 is not allowed to assume bus mastership of DSD bus 650 in the exemplary embodiment. DSD bus arbitration and control block 702, may be coupled to disk controller 682 via interface 651 (see FIG. 8). Interfaces 704 may be a bus request from disk controller 682 and interface 706 may be a bus acknowledge signal to disk controller 682.

In an exemplary embodiment, when disk controller 682 assumes bus mastership, it may relinquish bus ownership after a maximum of 16 bus cycles. Disk controller 682 may then wait 5 clock cycles before asserting a bus request to regain bus mastership. The 5 clock cycles provides a "fairness" delay to allow DSDC 636 to gain bus mastership if required.

DSDC 636 may comprise at least four basic data paths. A first basic data path may provide an interface between DBIF 618 and DSD bus 650. This path may comprise a register 706, a multiplexer 710, a register 712, a FIFO block 714, a register 716, a multiplexer 718, a data-out-register 720, and an I/O buffer block 722. Register 706 may receive data elements from DBIF 618 via interface 626. Register 706 may be coupled to multiplexer 710 via interface 724. Also coupled to interface 724 may be a parity check block 708. Parity Check block 708 may check the parity of a data element as it is released from register 706.

Multiplexer 710 may select interface 724 when transferring data between DBIF 618 and DSD bus 650. The data may then be provided to register 712 via interface 726 wherein register 712 may stage the data for FIFO 714. The data may then be provided to FIFO 714 via interface 728. Also coupled to interface 728 may be a parity check block 730. Parity Check block 730 may check the parity of a data element as it is released from register 712.

FIFO 714 may comprise a 34 bit by 64 word FIFO. FIFO 714 may function as a buffer between DBIF 618 and DSD bus 650. This may be desirable because disk controller 682 may have to arbitrate for DSD bus 650, thus causing an unpredictable delay. FIFO 714 may store the data that is transferred by DBIF 618 to DSDC 636 until disk controller 682 is able to gain control of DSD bus 650. Once disk controller 682 gains access to DSD bus 650, FIFO 714 may wait for eight (8) words to be transferred from DBIF 618 to FIFO 714 before sending the data over DSD bus 650.

Once released by FIFO 714, the data may be provided to register 716 via interface 732. Register 716 may store the output of FIFO 714. The data may then be provided to multiplexer 718 via interface 734. Multiplexer 718 may select interface 734 when transferring data between DBIF 618 and DSD bus 650. The data may then be provided to data-out-register 720 via interface 736, wherein data-out-register 720 may stage the data for I/O buffer block 722. Parity conversion block 738 may provide a two to four bit parity conversion. That is, data arriving from DBIF 618 via multiplexer 718 may only have two parity bits associated therewith. It may be desirable to convert the two parity bits to a four parity bit scheme. Data-out-register 720 may then provide the data to I/O buffer block 722 via interface 740. I/O buffer block 722 may comprise a plurality of bi-directional transceivers wherein each of the transceivers may be enabled to drive the data onto DSD bus 650 via interface 654.

A second basic data path of DSDC 636 may provide an interface between DSD bus 650 and DBIF 618. This path may comprise I/O buffer block 722, a data-in-register 742, multiplexer 710, register 712, FIFO block 714, register 716, a multiplexer 744, a register 746, a multiplexer 748, and a register 750. For this data path, I/O buffer block 722 may be enabled to accept data from DSD bus 650 and provide the data to data-in-register 742 via interface 752. Data-in-register 742 may provide the data to multiplexer 710 via interface 754. Also coupled to interface 754 may be a parity check block 756. Parity Check block 756 may check the parity of a data element as it is released by data-in-register 742. Parity conversion block 758 may provide a four to two bit parity conversion. That is, data arriving from DSD bus 650 may have four parity bits associated therewith while DBIF interface 634 may only have two parity bits associated therewith. It may be desirable to convert the four parity bits to a two parity bit scheme.

Multiplexer 710 may select interface 754 when transferring data between DSD bus 650 and DBIF 618. The data may then be provided to register 712 via interface 726 wherein register 712 may stage the data for FIFO 714. The data may then be provided to FIFO 714 via interface 728. Also coupled to interface 728 may be parity check block 730. Parity Check block 730 may check the parity of a data element as it is released from register 712.

FIFO 714 may function as a buffer between DSD bus 650 and DBIF 618. This may be desirable because DBIF 618 may have to wait to gain access to the streets via interface 632. FIFO 714 may store data that is transferred by DSD bus 650 until DBIF 618 can gain access to the streets.

Once released by FIFO 714, the data may be provided to register 716 via interface 732. Register 716 may store the output of FIFO 714. The data may then be provided to multiplexer 744 via interface 760. Multiplexer 744 may select the data provided by register 716 during a data transfer between DSD bus 650 and DBIF 618. Multiplexer 744 may then provide the data to register 746 via interface 762. Register 746 may then provide the data to multiplexer 748 via interface 764. Multiplexer 748 may select 16 bits at a time of a 32 bit word provided by register 746. This may be necessary because the DSD bus may comprise a 32 bit word while the interface to DBIF 618 may only be 16 bits wide. Also coupled to interface 764 may be parity check block 768. Parity Check block 768 may check the parity of a data element as it is released from register 746. Multiplexer 748 may then provide the data to register 750. Register 750 may provide the data to DBIF 618 via interface 634.

A third basic data path of DSDC 636 may provide an interface between MBUS 638 and DSD bus 650. This path may comprise a I/O buffer block 770, a register 772, an address decode and recognition logic block 780, a multiplexer 774, a register 776, multiplexer 718, data-out-register 720, and I/O buffer block 722. For this data path, USBC's 640, 642 may provide a request to DSDC 636 via MBUS 638. The request may comprise a data word, an address, and/or a number of control signals. In the exemplary embodiment, a request comprising an address and a number of control signals may be provided over MBUS 638 first wherein a data word may follow on MBUS 638, if appropriate. I/O buffer block 770 may receive the request via interface 638 and may provide the request to register 772 via interface 784. Register 772 may provide the request to multiplexer 774 and to an address decode and recognition block 780 via interface 786. Also coupled to interface 786 may be a parity check block 788. Parity Check block 788 may check the parity of the request as it is released from register 772. Multiplexer 774 may select interface 786 during transfers from MBUS 638 to DSD bus 650. Multiplexer 774 may provide the request to register 776 via interface 790. Register 776 may then provide the request to multiplexer 718 via interface 792. Also coupled to interface 792 may be a parity check block 778. Parity Check block 778 may check the parity of the request as it is released from register 776.

Multiplexer 718 may select interface 792 when transferring data between MBUS 618 and DSD bus 650. Multiplexer 718 may provide the data word to data-out-register 720 via interface 736 wherein data-out-register 720 may stage the data word for I/O buffer block 722. Parity conversion block 738 may provide a two to four bit parity conversion. That is, data arriving from MBUS 638 via multiplexer 718 may only have two parity bits associated therewith. It may be desirable to convert the two parity bits to a four parity bit scheme. Data-out-register 720 may then provide the data word to I/O buffer block 722 via interface 740. I/O buffer block 722 may be enabled to drive the data word onto DSD bus 650 via interface 654.

A fourth basic data path of DSDC 636 may provide an interface between DSD bus 650 and MBUS 638. This path may comprise I/O buffer block 722, data-in-register 742, parity conversion block 758, multiplexer 774, a multiplexer 777, register 776, a register 794, and I/O buffer block 770. I/O buffer block 722 may receive a data element from DSD bus 650. In an exemplary embodiment, the data element may comprise pointers and/or temporary data requested by USBC0 640 or USBC1 642 from memory 680. I/O buffer block 722 may provide the pointers and/or temporary data to data-in-register 742 via interface 752. Data-in-register 742 may provide the pointers and/or temporary data to parity conversion block 758 via interface 754. Parity conversion block 758 may provide a four to two bit parity conversion thereof. Parity conversion block 758, and register 742 may then provide the pointers and/or temporary data to multiplexer 774 via interface 754. Multiplexer 774 may select interface 754 when transferring data between DSD bus 650 and MBUS 638. Multiplexer 774 may then provide the pointer and/or temporary data to register 776 via interface 790. Register 776 may provide the pointers and/or temporary data to multiplexer 777 via interface 792. Multiplexer 777 may select interface 792 when transferring data between DSD bus 650 and MBUS 638. Multiplexer 777 may provide the pointers and/or temporary data to register 794. Register 794 may provide the pointers and/or temporary data to I/O buffer block 770 via interface 796. Also coupled to interface 796 may be a parity check block 798. Parity Check block 798 may check the parity of the data as it is released from register 794. I/O buffer block 770 may provide the pointers and/or temporary data to USBC0 640 or 642 via MBUS 638.

USBCs 640 and 642 do not interface directly with DSD bus 650 but rather may access memory 680 and disk controller 682 indirectly using registers in DSDC 636. For example, when USBC0 640 performs a read of memory 680, it initiates the transfer by writing a DSDC register 772 with the requested address. Register 772 may provide the address to address recognition logic block 780 via interface 786. The address may then be provided to register 773 (see FIG. 9B). Register 773 may then provide the address to multiplexer 852. Multiplexer 852 may select the output of register 773 when transferring an address from USBC0 640 to memory 680. Multiplexer 852 may then provide the address to address register 856 via interface 858.

DSDC 636 then performs bus arbitration, and provides the address to memory 680 via I/O transceiver block 782. Memory 680 then provides the requested data on DSD bus 650. DSDC 636 may then read the data on DSD bus 650 and provide the result to MBUS 638. Referring to FIG. 9A, register 742 may receive the read data word and may provide the read data word to multiplexer 774 via interface 754. Multiplexer 774 may then provide the read data word to register 776 wherein register 776 may provide the read data word to multiplexer 777. Multiplexer 777 may then provide the read data word to register 794 wherein the read data word may be provided to USBC0 640 via I/O buffer 770. Depending on whether an address or a data word is provided by USBC0 640 via MBUS 638, the corresponding address or data element may be routed to the appropriate location within DSDC 636.

In addition to providing the above reference data paths, DSDC 636 may provide a number of other functions. For example, logic may be provided to allow a test function of memory 680 and disk controller 682. For example, DSDC 636 may have a dynamic scan register 809 which may be coupled to NIM 635 via interface 633. NIM 635 may scan in an address and a function code into dynamic scan register 809. The address may then be provided to address register 851 (see FIG. 9B) within address decode and recognition logic block 780 via interface 810. Register 851 may provide the address to address output register 856 via multiplexer 852.

For a dynamic read operation of memory 680, the address may be an initial read address which may be scanned into dynamic scan register 809 as described above. Thereafter, the address may be automatically incremented by an auto-increment block 826 (see FIG. 9B) such that a number of successive read operations may be made to memory 680. After the initial address is provided, NIM 635 may provide a control word to dynamic scan register 809. The control word may comprise a word count and a function code. For a read operation, the function code may indicate a read function. The word count may be latched into a word count register 853 (see FIG. 9B) wherein after each read operation, the word count register may be decremented. When the word count register reaches a value of zero, DSDC 636 may terminate the above referenced read operation. For each read operation performed, the resulting data may be latched into data-in-register 742. A multiplexer 800 may then select interface 754 thereby storing the resulting data into register 802. The data may then be provided to dynamic scan register 809 via interface 812. The resulting data may then be scanned out of dynamic scan register 809 via NIM 635 for analysis.

For a write operation, the address may be an initial write address and function code which may be scanned into dynamic scan register 809 as described above. Thereafter, the address may also be automatically incremented by an auto-increment block 826 (see FIG. 9B) such that a number of successive write operations may be made to memory 680. For a write operation, the function code may indicate a write function. For each write operation performed, a corresponding data word may be scanned into dynamic scan register 809. The data word may be provided to multiplexer 800 wherein multiplexer 800 may provide the data word to register 802. Register 802 may provide the data word to multiplexer 718 via interface 812. Multiplexer 718 may provide the data word to data-out-register 720 via interface 736 wherein data-out-register 720 may stage the data word for I/O buffer block 722. Data-out-register 720 may then provide the data word to I/O buffer block 722 via interface 740. I/O buffer block 722 may be enabled to drive the data word to memory 680 via interface 654. The exemplary read and write operations discussed above may be used to perform tests on memory 680 and/or disk controller 682.

Another exemplary function that may be provided by DSDC 636 may be to support a partial block update function provided by host interface adapter 534. That is, in the exemplary system, a file may comprise a plurality of segments and each of the plurality of segments may comprise a plurality of blocks. Each of the blocks may comprise a plurality of words. When a host processor only updates a portion of a file, it may be advantages to only over-write the affected portions of the file to non-volatile memory 540. The host interface adapter block 534 supports the partial block update function. However, some of the supporting logic is located on DSDC ASIC 636. The partial block update function may increase the performance of the file caching system.

Register 830, wobb first block 832, wobb last block 834, and register 836 may support the partial block update function of the host interface adapter 534. A further discussion of the partial block update function may be found in the above referenced co-pending patent application Ser. No. 08/172,663, which is incorporated herein by reference.

SRAM control-block mode-and bist block 822 may provide a number of functions. For example, SRAM control-block mode-and bist block 822 may provide a number of control signals to memory 680 via interface 653. Other exemplary function may be to provide error detection and test to memory 680.

Finally, DSDC 636 may provide a data ready block 824 which may be coupled to MBUS 638. Data ready block 824 may indicate to USBC 640,642 when a corresponding read operation has been completed by DSDC 636.

Figure 9B:
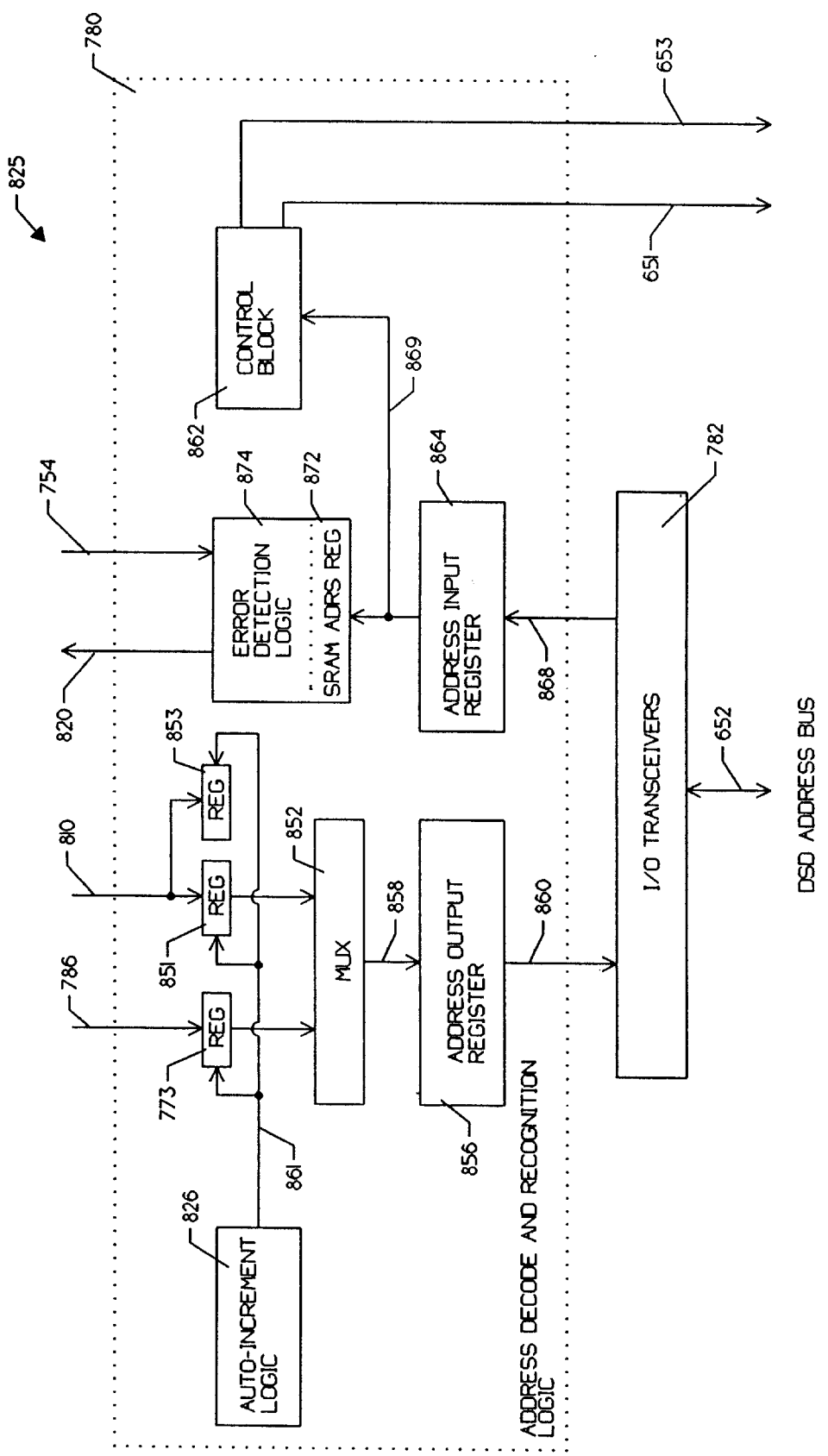
FIG. 9B is a block diagram showing applicable portions of the Address and Recognition Logic block of FIG. 9A.

FIG. 9B is a block diagram showing applicable portions of the Address and Recognition Logic block of FIG. 9A. The block diagram is generally shown at 825. In the exemplary embodiment, Address and Recognition Logic block 780 may comprise an address output register 856 and an address input register 864. Address output register 856 may be coupled to an outgoing port of I/O buffer block 782 via interface 860.

Similarly, address input register 864 may be coupled to an in-going port of I/O buffer block 782 via interface 868.

An address may be provided to register 773 by MBUS 638 via interface 786, as described above. Further, an address may be provided to register 851 by dynamic scan register 809 via interface 810, as described above. When MBUS 638 is providing an address to DSD address bus 652, multiplexer 852 may select the output of register 773. Similarly, when NIM 635 is providing an address via dynamic scan register 809, multiplexer 852 may select the output of register 851. Multiplexer 852 may provide the selected address to address output register 856 via interface 858. Address output register 856 may provide the address to DSD address bus 652 via I/O buffer block 782.

Address recognition block 780 may determine if a request on interface 786 comprises an address. If the request comprises an address, corresponding control signals provided by register 772 via interface 786 may determine the appropriate format thereof. For example, one format for an address may indicate that the present address should be loaded, but each address thereafter should be generated by an automatic increment block 826 (see FIG. 11). Address recognition logic block 780 may make this determination and alert auto-increment block 826. Auto-increment block 826 may thereafter automatically increment and/or decrement the value in registers 773, 851, or 853 via interface 861.

Address input register 864 may be coupled to DSD address bus 652 via I/O buffer block 782. Address input register 864 may latch the contents of DSD address bus 652 and monitor the contents thereof. Address input register 864 may be coupled to a control block 862 via interface 869. Control block 862 may monitor the DSD address via the address input register 864 and provide appropriate control signals to DSD bus 650 via interfaces 651 and 653. In the exemplary embodiment, control block 862 may provide control signals that memory 680 and disk controller 682 may not otherwise provide. For example, control block 862 may provide four (4) byte enable signals, and a read/write enable signal (see FIGS. 10A–10B) to memory 680 via interface 653. Also, the NCR53C720 SCSI controller 682 requires a ready-in signal to be asserted by a slave device indicating that the slave device is ready to transfer data. DSDC ASIC 636 may provide the ready-in signal to NCR53C720 SCSI controller 682 via interface 651 for both DSDC 636 and memory 680.

Finally, an error detection logic block 874 may be coupled to address input register 864 via interface 869. Error detection logic block 874 may comprise an SRAM address register 872. SRAM address register 872 may capture an SRAM address when an SRAM read error is detected. That is, SRAM address register 872 may store the read address that is present on DSD address bus 650 in response to an SRAM read error. Error detection block 874 may monitor the data that is present in DSD bus 650 via interface 754. Error detection block 874 may thus perform a parity check or the like on the data presently read from memory 680. If an error exists, error detection block 874 may enable SRAM address register thereby capturing the current read address. This may identify the faulty read address within memory 680. Error detection block 874 may then provide the faulty read address to USBC0 640 for further processing via interface 820. For example, USBC0 640 may read and write various test patterns to the faulty read address to determine if the fault was caused by a soft error or a hard error. If the fault was caused by a soft error, the contents of memory 680 may be reloaded and the operation of the computer system may continue. However, if the fault was caused by a hard error, the operation of the computer system may be interrupted. Other error detection schemes are contemplated and may be incorporated into error detection block 874.

FIGS. 10A–10B comprise a table illustrating an exemplary bus description of the DSD bus of FIG. 8. The table is generally shown at 900. DSD bus 650 may comprise a number of fields. The type of fields can be generally broken down into data fields, address fields, parity fields, and control fields. The fields for an exemplary embodiment of DSD bus 650 are described below.

DSD bus 650 may comprise a 32 bit data bus as shown at 902. The 32 bit data bus is a bi-directional data bus and may serve as the main data path for all operations. The 32 bit data bus may be asserted by a bus master for write operations and a bus slave for read operations.

DSD bus 650 may further comprise a 4 bit data parity bus as shown at 904. Each of the four parity bits may correspond to predetermined data bits of 32 bit data bus 902. The 4 bit data parity bus may be used for error detection and correction purposes.

DSD bus 650 may further comprise a 30 bit address bus as shown at 906. The 30 bit address bus is a bi-directional address bus and may serve as the main address path for all operations. The 30 bit address bus may be asserted by a bus master.

DSD bus 650 may further comprise an address status line (ADS\) as shown at 908. The address status line may be active low and when asserted by a bus master, may indicate that the value on the 30 bit address bus 906 are valid. In an exemplary mode, the address status line may be asserted to indicate a start of a bus cycle.

DSD bus 650 may further comprise a write/read line (W-R\) as shown at 910. The write/read line may be active low and may indicate the direction of the data transfer relative to the bus master. The write/read line may be driven by the bus master.

DSD bus 650 may further comprise a hold line as shown at 912. The hold line may be asserted by the disk controller 682 to request bus mastership. The hold line may be active low and may be provided by the NCR53C720 SCSI I/O processor 682.

DSD bus 650 may further comprise a hold acknowledge (HLDAI\) line as shown at 914. The hold acknowledge line may be asserted by DSD bus arbitration logic 786 to indicate that the previous bus master has relinquished control of the DSD bus 650. The hold acknowledge line may be active low.

DSD bus 650 may further comprise a bus clock (BCLK) line as shown at 916. The bus clock signal may control the DMA portion of the NCR53C720 SCSI I/O processor 682. The bus clock may be provided by DSDC 636.

DSD bus 650 may further comprise a chip reset line as shown at 918. The chip reset line may be active low and may force a synchronous reset of the NCR53C720 SCSI I/O processor 682. In the exemplary embodiment, the chip reset line may be asserted by DSDC 636 for a minimum of 15 bus cycles.

DSD bus 650 may further comprise a chip select (CS\) line as shown at 920. The chip select line may select the NCR53C720 SCSI I/O processor 682 as a slave device. In the exemplary embodiment, the chip select line may be active low and may be connected to address bit 6 of the 30 bit address bus discussed above.

DSD bus 650 may further comprise an interrupt (IRQ\) line as shown at 922. The interrupt line may be active low and may indicate that service is required from USBC0 640 and/or USBC1 642.

Referring to FIG. 10B, DSD bus 650 may further comprise four byte enable (BE) lines as shown at 924, 926, 928, and 930. Each of the bus enable lines may be active low and each may be asserted by the bus master. A first byte enable line (BE0) may enable the transfer of data over data bus lines 24–31. A second byte enable line (BE1) may enable the transfer of data over data bus lines 16–23. A third byte enable line (BE2) may enable the transfer of data over data bus lines 8–15. Finally, a fourth byte enable line (BE3) may enable the transfer of data over data bus lines 0–7.

DSD bus 650 may further comprise a ready-in (READYI\) line as shown at 932. The ready-in line may be provided by the slave device to the master device indicating that the slave device is ready to transfer data to the master device. The ready-in line may be active low and may be provided by DSDC 636 even if DSDC 636 is not the master of the bus.

DSD bus 650 may further comprise a ready-out (READYO\) line as shown at 934. The ready-out line may be asserted to indicate the end of a slave cycle. In the exemplary embodiment, the ready-out line may be active low and may be provided by disk controller 682 to terminate a slave cycle.

DSD bus 650 may further comprise a master line as shown at 936. The master line may be asserted by the NCR53C720 I/O processor 682 to indicate it has become bus master. The master line may be active low.

DSD bus 650 may further comprise a bus mode select (BS) bus as shown at 938. The bus mode select bus may select the bus mode and addressing mode of the NCR53C720 I/O processor 682. In the exemplary embodiment, the bus mode select bus is set to "010" thereby selecting a 80386DX like bus mode (bus mode 4) and the big endian addressing mode.

Finally, DSD bus 650 may further comprise a scripts autostart mode (AUTO\) line at shown at 940. The scripts autostart mode line selects either auto or manual scritps start mode. Script routines may be stored in memory 680 and may control a RISC processor in NCR53C720 SCSI I/O processor 682. When scripts autostart mode is set low, the execution of the scripts programs starts at address zero of a DSP register within NCR53C720 SCSI I/O processor 682, immediately following a chip reset. When scripts autostart mode is set high, the execution of the scripts programs starts at an address which corresponds to a value which is loaded into the DSP register by USBC0 640 and/or USBC1 642, immediately following a chip reset. In the exemplary embodiment, the scripts auto start mode line is set to one.

As indicated with reference to FIG. 8, a number of control signals may be provided between DSDC 636 and disk controller 682 via interface 651. These signals may include the signals shown at 906, 908, 910, 912, 914, 916, 918, 920, 922, 932, 934, 936, and 938. Similarly, a number of control signals may be provided between DSDC 636 and memory 680 via interface 653. These signals may include a memory read/write enable signal and the four byte enable signals shown at 924, 926, 928 and 930.

Figure 11:
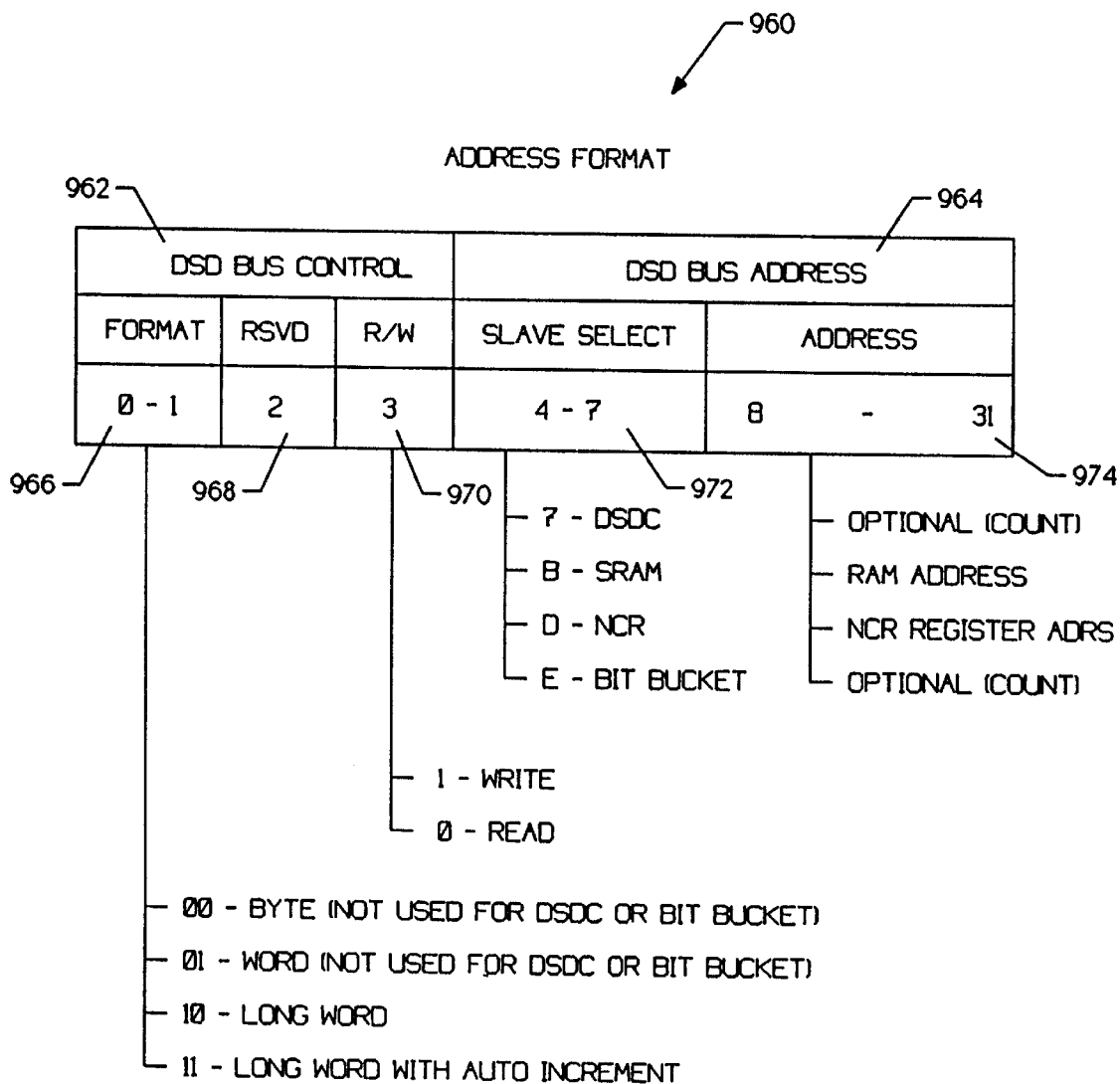
FIG. 11 is a table illustrating an exemplary address format for the address field of the DSD bus of FIG. 8.

FIG. 11 is a table illustrating an exemplary address format for the address field of the DSD bus of FIG. 8. The table is generally shown at 960. The address format of the address field of DSD bus 650 may comprise DSD bus control signals 962 and DSD bus address signals 964. The DSD bus control signals may comprise a format field 966, a reserved field 968, and a read/write field 970. The DSD address signals may comprise a slave select field 972 and an address field 974.

The format field 966 may specify the format of a corresponding address. For example, the format field may specify the format of a corresponding address as a long word or a long word with auto increment. The auto increment option is further discussed above with reference to FIG. 9A and FIG. 9B. The read/write field 970 may indicate whether the corresponding address is requesting a read or write operation.

The slave select field 972 may indicate which of the three devices attaches to DSD bus 650 is to be the slave. That is, if DSDC 636 has bus mastership and is providing the address, the slave select field may indicate whether NCR53C720 682 or memory 680 is to be the slave. Finally, the address field 974 provides a valid address to the selected slave device. That is, if memory 680 is the slave device, the address field 974 may provide a valid memory address thereto. Under some conditions, the address field is optional as shown. That is, when DSDC 636 is the slave device, the address field is optional. The slave select field identifier shown below slave select field 972 correspond to the address field identifiers shown below address field 974. Format bits 0 and 1, and address bits 30 and 31 may be decoded to provide the bi-directional byte enable signals 924, 926, 928, and 930 as shown in FIG. 10B.

Figure 12:
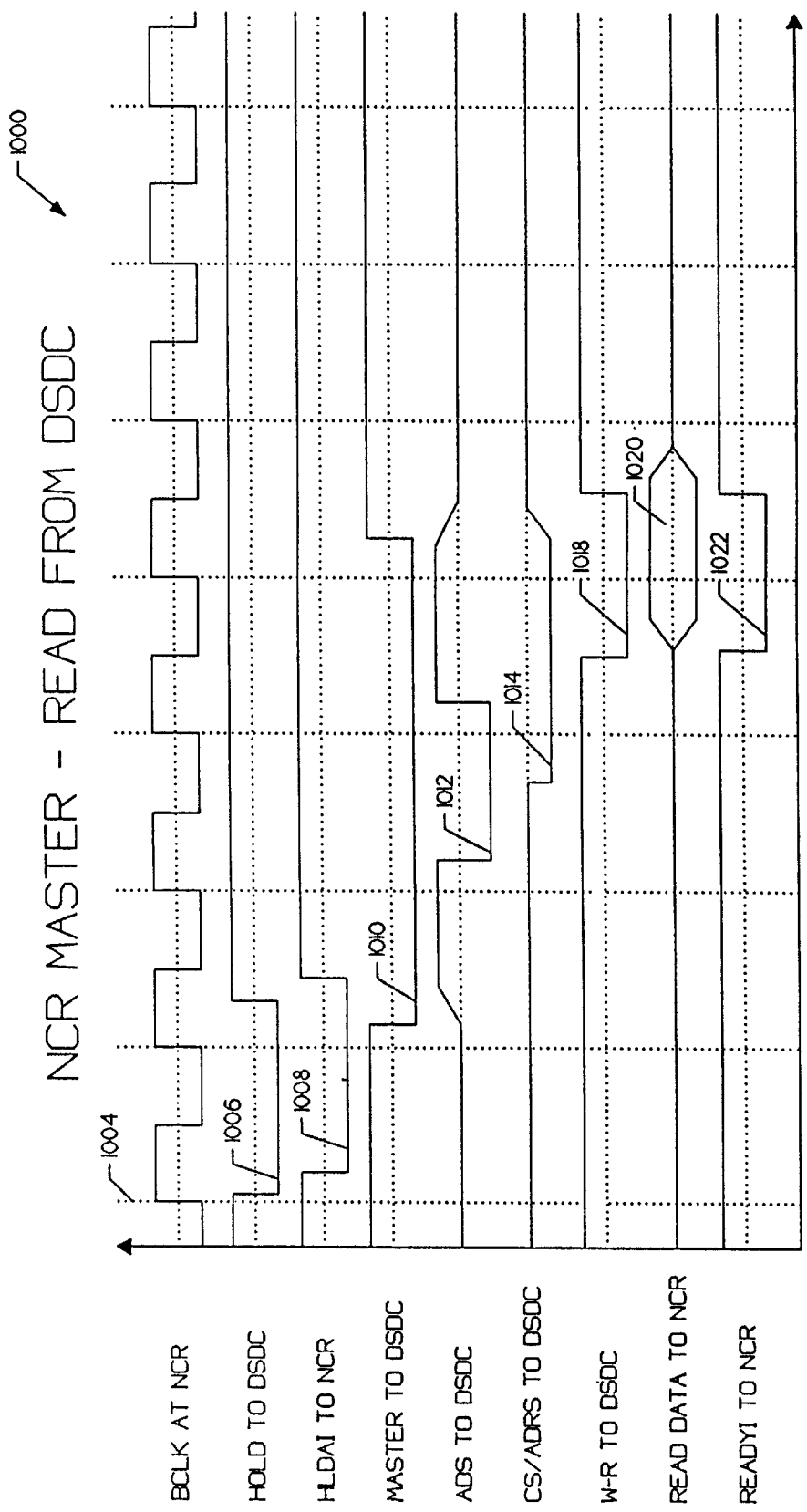
FIG. 12 is a timing diagram illustrating an exemplary read cycle on the DSD bus wherein the NCR chip is the master and the DSDC device is the slave.

FIG. 12 is a timing diagram illustrating an exemplary read cycle on the DSD bus wherein the NCR chip is the master and the DSDC device is the slave. The timing diagram is generally shown at 1000. In the exemplary embodiment, NCR53C720 682, memory 680, and DSDC 636 are coupled to the DSD bus 650. Tri-state transceivers are used by all three devices to interface with the bi-directional lines of the DSD bus 650. Data transfer cycles are initiated and terminated by whichever device is bus master at given time. The direction of data transfer (read/write) is relative to the bus master. Only one device can be bus master for a given data transfer cycle.

When one of the three devices is the bus master, one of the two remaining devices may be the bus slave, and is either the source (read) or destination (write) of the data transfer. The third device on DSD bus 650 is inactive. NCR53C720 682 and DSDC 636 may be either a bus master or a bus slave, while memory 680 may only be a bus slave. Arbitration logic 786 in DSDC 636 may determine which device will be the next bus master when the present bus master relinquishes control of DSD bus 650.

Referring specifically to NCR53C720 682, NCR53C720 682 arbitrate for bus mastership to fetch SCRIPTS instructions from memory 680 and to transfer data to/from the SCSI interface 554. After an instruction fetch or data transfer is complete, NCR53C720 682 may relinquish bus mastership. When executing block move instructions, NCR53C720 682 may relinquish bus mastership after transferring eight long words. However, if more data needs to be transferred, NCR53C720 682 may wait 5 to 8 clock cycles and then initiates arbitration to regain bus mastership to transfer up to 8 more long words. This process may continue until the block move instruction is complete. In the exemplary embodiment, the effective data transfer rate of a block move instruction to/from the SCSI disk(s) may be in excess of 20 MB/s.

Referring specifically to FIG. 12, wherein an exemplary read operation is shown with NCR53C720 682 as bus master and DSDC 636 is bus slave. The signal names provided along the left side of timing diagram 1000 generally correspond to the signals described with reference to FIGS. 10A and 10B.

At time 1004, NCR53C720 682 may assert a hold signal as shown at 1006, indicating to all of the devices coupled to DSD bus 650 that NCR53C720 682 is requesting bus mastership. Arbitration logic 786 within DSDC 636 may receive the hold signal 1006 and may assert a hold acknowledge signal in response thereto, as shown at 1008, indicating that the previous bus master has relinquished control of DSD bus 650. On the next bus clock cycle, NCR53C720 682 may assert a master signal to DSDC 636 as shown at 1010, indicating to DSDC 636 that NCR53C720 682 has become bus master of DSD bus 650. NCR53C720 682 may then assert an address status signal as shown at 1012. The address status signal indicates the start of a bus cycle. Shortly thereafter, and while the address status signal is still asserted, NCR53C720 682 may provide an address to DSDC 636 as shown at 1014. The select slave field of the address may select DSDC 636 to be the slave for this bus transaction.

NCR53C720 682 may then provide a read/write signal 1018 to DSDC 636. The read/write signal 1018 indicates that NCR53C720 682 is requesting to read data from DSDC 636. Finally, DSDC 636 may provide a ready-in 1022 signal to NCR53C720 682, indicating that DSDC 636 is ready to transfer data thereto. The read data on DSD bus 650 may then be provided as shown at 1020.

Figure 13:
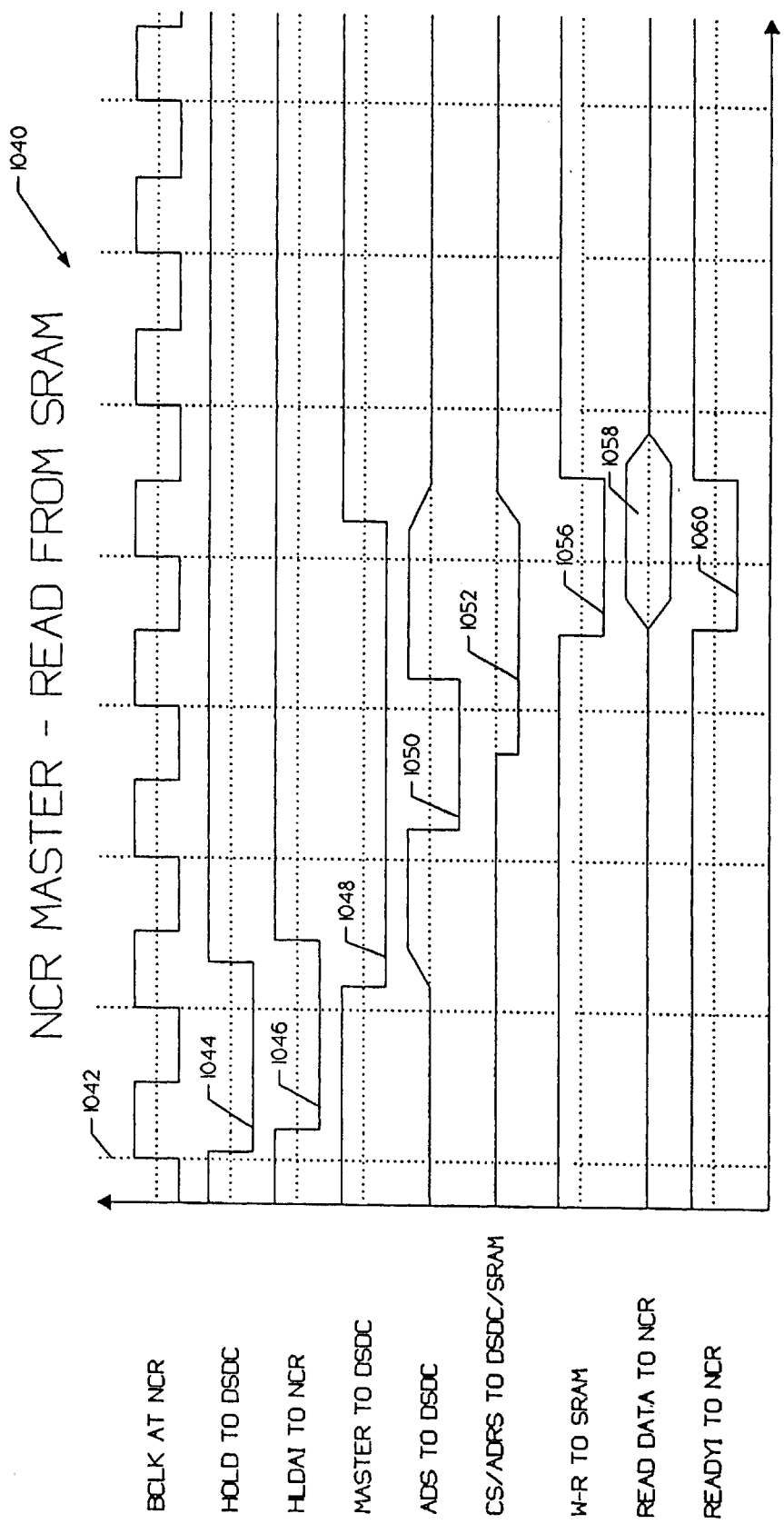
FIG. 13 is a timing diagram illustrating an exemplary read cycle on the DSD bus wherein the NCR chip is the master and the SRAM device is the slave.

FIG. 13 is a timing diagram illustrating an exemplary read cycle on the DSD bus wherein the NCR chip is the master and the SRAM device is the slave. The timing diagram is generally shown at 1040. The signal names provided along the left side of timing diagram 1040 generally correspond to the signals described with reference to FIGS. 10A and 10B.

At time 1042, NCR53C720 682 may assert a hold signal as shown at 1044, indicating to all of the devices coupled to DSD bus 650 that NCR53C720 682 is requesting bus mastership. Arbitration logic 786 within DSDC 636 may receive the hold signal 1044 and may assert a hold acknowledge signal in response thereto, as shown at 1046, indicating that the previous bus master has relinquished control of DSD bus 650. On the next bus clock cycle, NCR53C720 682 may assert a master signal to DSDC 636 as shown at 1048, indicating to DSDC 636 that NCR53C720 682 has become bus master of DSD bus 650. Note that it is not necessary to provide the master signal to memory 680 because memory 680 cannot be a bus master. NCR53C720 682 may then assert an address status signal as shown at 1050. The address status signal indicates the start of a bus cycle. Shortly thereafter, and while the address status signal is still asserted, NCR53C720 682 may provide an address to DSDC 636 and memory 680 as shown at 1052. The select slave field of the address may select memory 680 to be the slave for this bus transaction.

NCR53C720 682 may then provide a read/write signal 1056 to memory 680. The read/write signal 1056 indicates that NCR53C720 682 is requesting to read data from memory 680. Finally, memory 680 may provide a ready-in signal 1060 to NCR53C720 682, indicating that memory 680 is ready to transfer data thereto. The read data on DSD bus 650 is shown at 1058.

Figure 14:
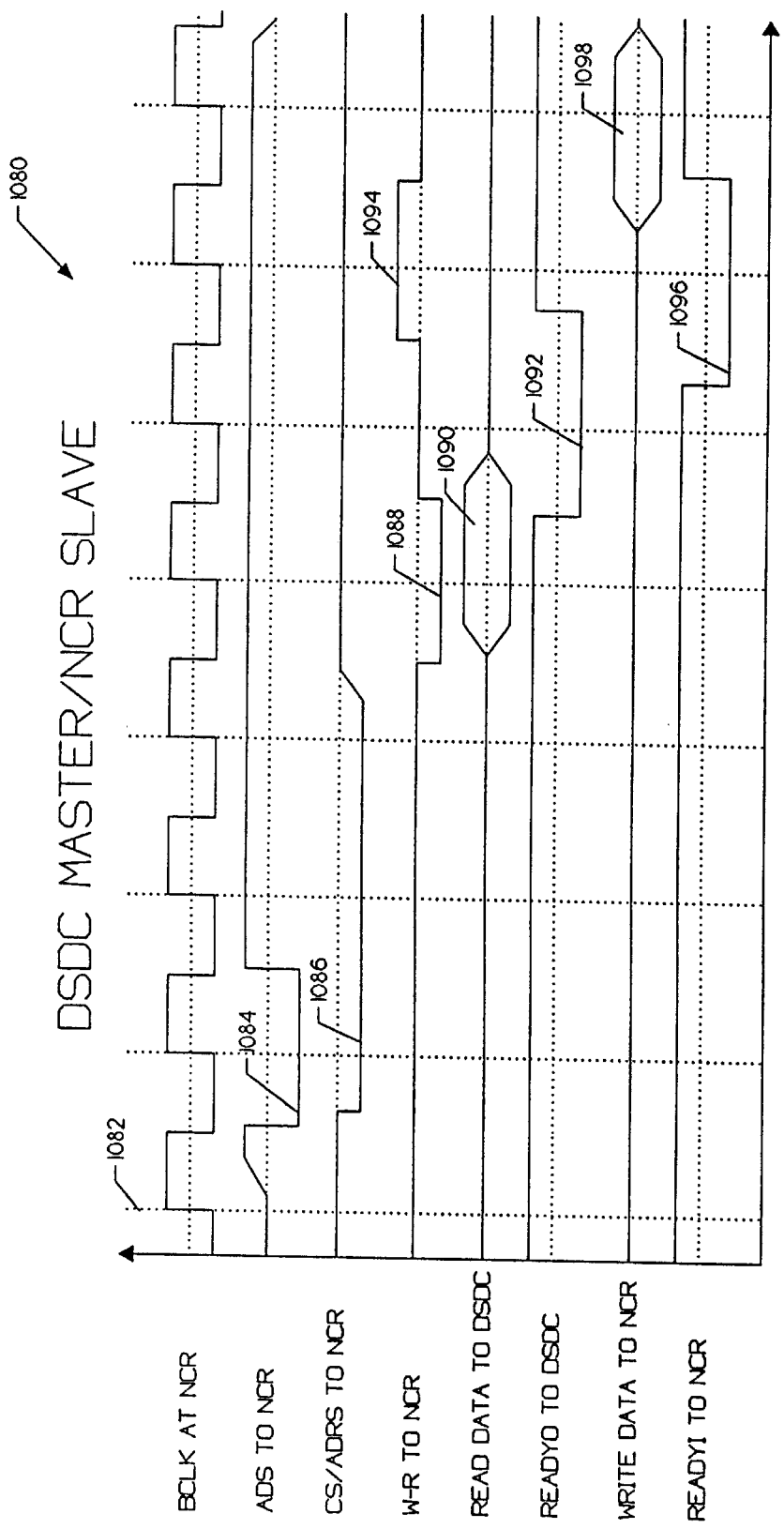
FIG. 14 is a timing diagram illustrating an exemplary read and write cycle on the DSD bus wherein the DSDC device is the master and the NCR chip is the slave.

FIG. 14 is a timing diagram illustrating an exemplary read and write cycle on the DSD bus wherein the DSDC device is the master and the NCR53C720 is the slave. The timing diagram is generally shown at 1080. At time 1082, DSDC 636 may assert an address status signal as shown at 1084. The address status signal indicates to NCR53C720 682 the start of a bus cycle. Shortly thereafter, and while the address status signal is still asserted, DSDC 636 may provide a chip select signal and an address to NCR53C720 682 and memory 680 as shown at 1086. The chip select signal selects the NCR53C720 682 as the slave device. The chip select signal may comprise the slave select field 972 of the DSD address 964.

DSDC 636 may then provide a read/write signal 1088 to NCR53C720 682. At 1088, DSDC 636 provides a low on the read/write signal indicating that DSDC 636 is requesting a read from NCR53C720 682. NCR53C720 682 may then provide the requested read data to DSDC 636 as shown at 1090. Thereafter, NCR53C720 682 may provide a ready-out signal 1092 to DSDC 636 to indicate the end of the slave bus cycle. DSDC 636 may then provide a read/write signal 1094 to NCR53C720 682. At 1094, DSDC 636 provides a high on the read/write signal indicating that DSDC 636 is requesting to write to NCR53C720 682. DSDC 636 may provide a ready-in signal 1096 to NCR53C720 682, indicating that DSDC 636 is ready to write data thereto. DSDC 636 may then provide the write data to NCR53C720 682 as shown at 1098.

Figure 15:
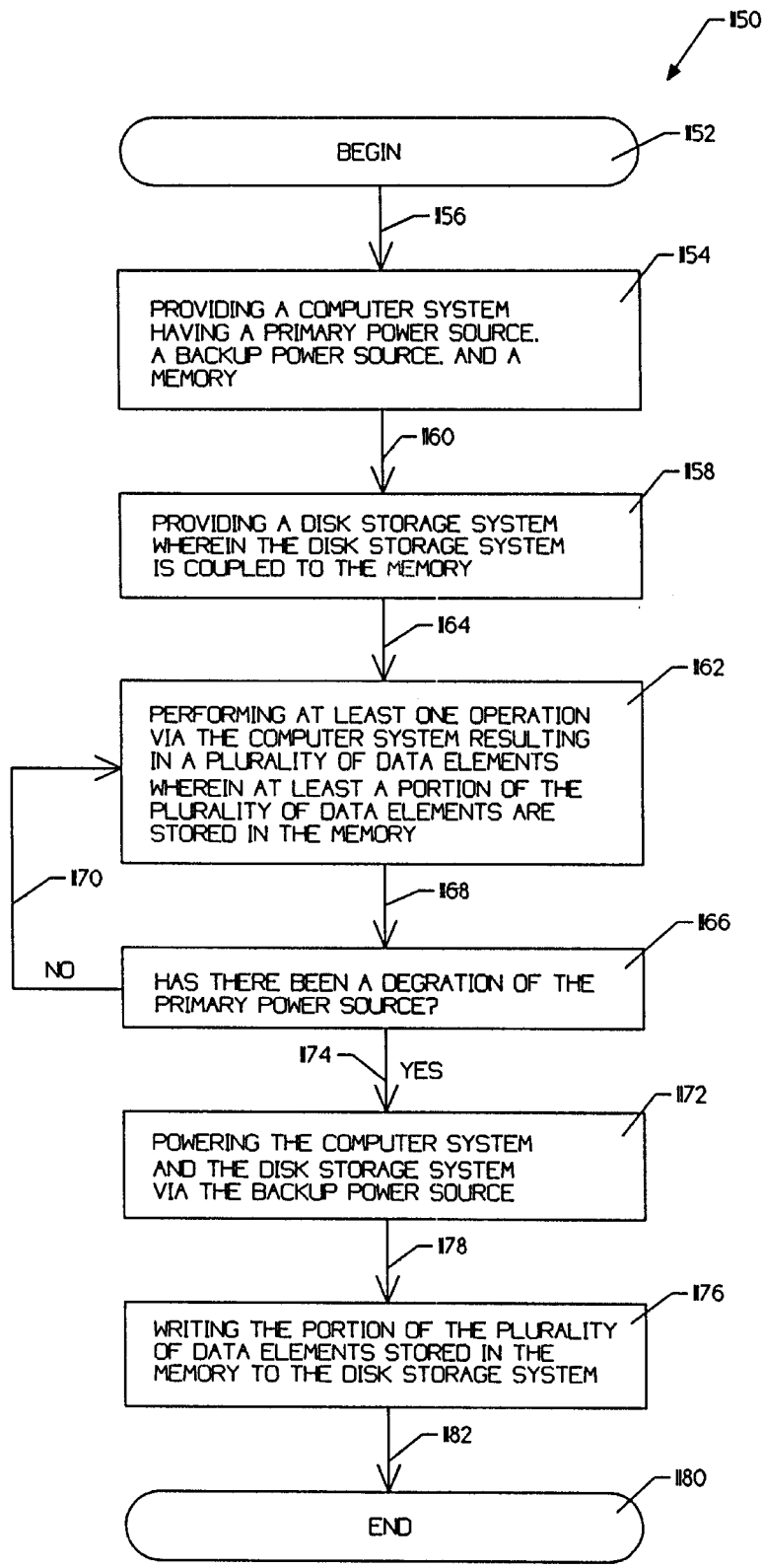
FIG. 15 is a flow diagram showing a first exemplary method of the present invention.

FIG. 15 is a flow diagram showing a first exemplary method of the present invention. The flow diagram is generally shown at 1150. The method is entered at element 1152, wherein control is passed to element 1154 via interface 1156. Element 1154 provides a computer system having a primary power source, a backup power source and a memory. Control is then passed to element 1158 via interface 1160. Element 1158 provides a disk storage system, wherein the disk storage system is coupled to the memory. Control is then passed to element 1162 via interface 1164. Element 1162 performs at least one operation via the computer system resulting in a plurality of data elements, wherein at least a portion of the plurality of data elements are stored in the memory.

Control is then passed to element 1166 via interface 1168. Element 1166 determines whether there has been a degradation of the primary power source. If there has not been a degradation of the primary power source, control is passed back to element 1162 via interface 1170. If there has been a degradation of the primary power source, control is passed to element 1172 via interface 1174. Element 1172 powers the computer system and the disk storage system via the backup power source. Control is then passed to element 1176 via interface 1178. Element 1776 writes the portion of the plurality of data elements stored in the memory to the disk storage system. Control is then passed to element 1180 via interface 1182, wherein the method is exited.

Figure 16:
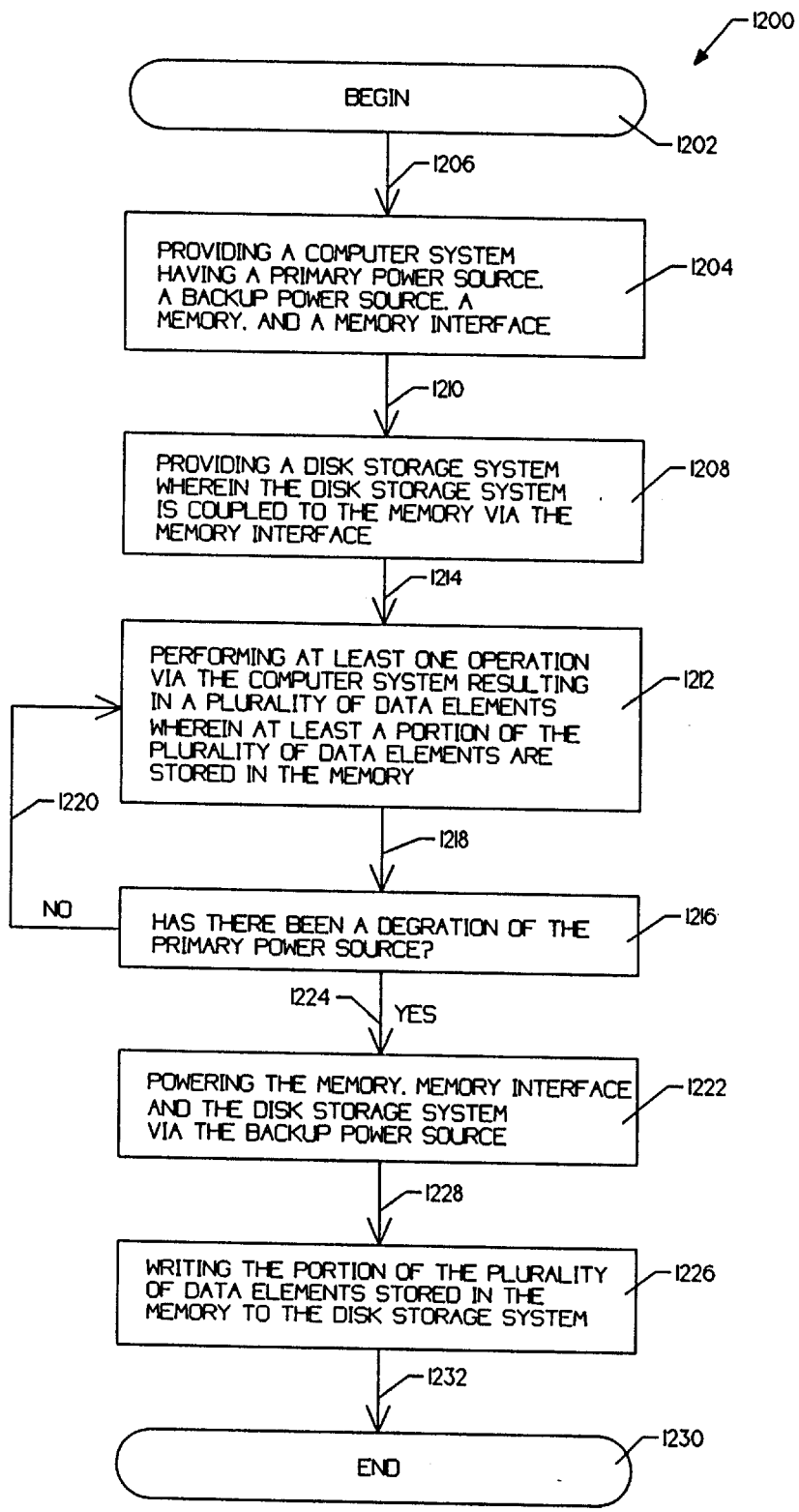
FIG. 16 is a flow diagram showing a second exemplary method of the present invention.

FIG. 16 is a flow diagram showing a second exemplary method of the present invention. The flow diagram is generally shown at 1200. The method is entered at element 1202, wherein control is passed to element 1204 via interface 1206. Element 1204 provides a computer system having a primary power source, a backup power source, a memory, and a memory interface. Control is then passed to element 1208 via interface 1210. Element 1208 provides a disk storage system, wherein the disk storage system is coupled to the memory via the memory interface. Control is then passed to element 1212 via interface 1214. Element 1212 performs at least one operation via the computer system, resulting in a plurality of data elements, wherein at least a portion of the plurality of data elements are stored in the memory.

Control is then passed to element 1216 via interface 1218. Element 1216 determines whether there has been a degradation of the primary power source. If there has not been a degradation of the primary power source, control is passed back to element 1212 via interface 1220. If there has been a degradation of the primary power source, control is passed to element 1222 via interface 1224. Element 1222 powers the memory, the memory interface, and the disk storage system via the backup power source. Control is then passed to element 1226 via interface 1228. Element 1226 writes the portion of the plurality of data elements stored in the memory to the disk storage system. Control is then passed to element 1230 via interface 1232, wherein the method is exited.

Figure 17:
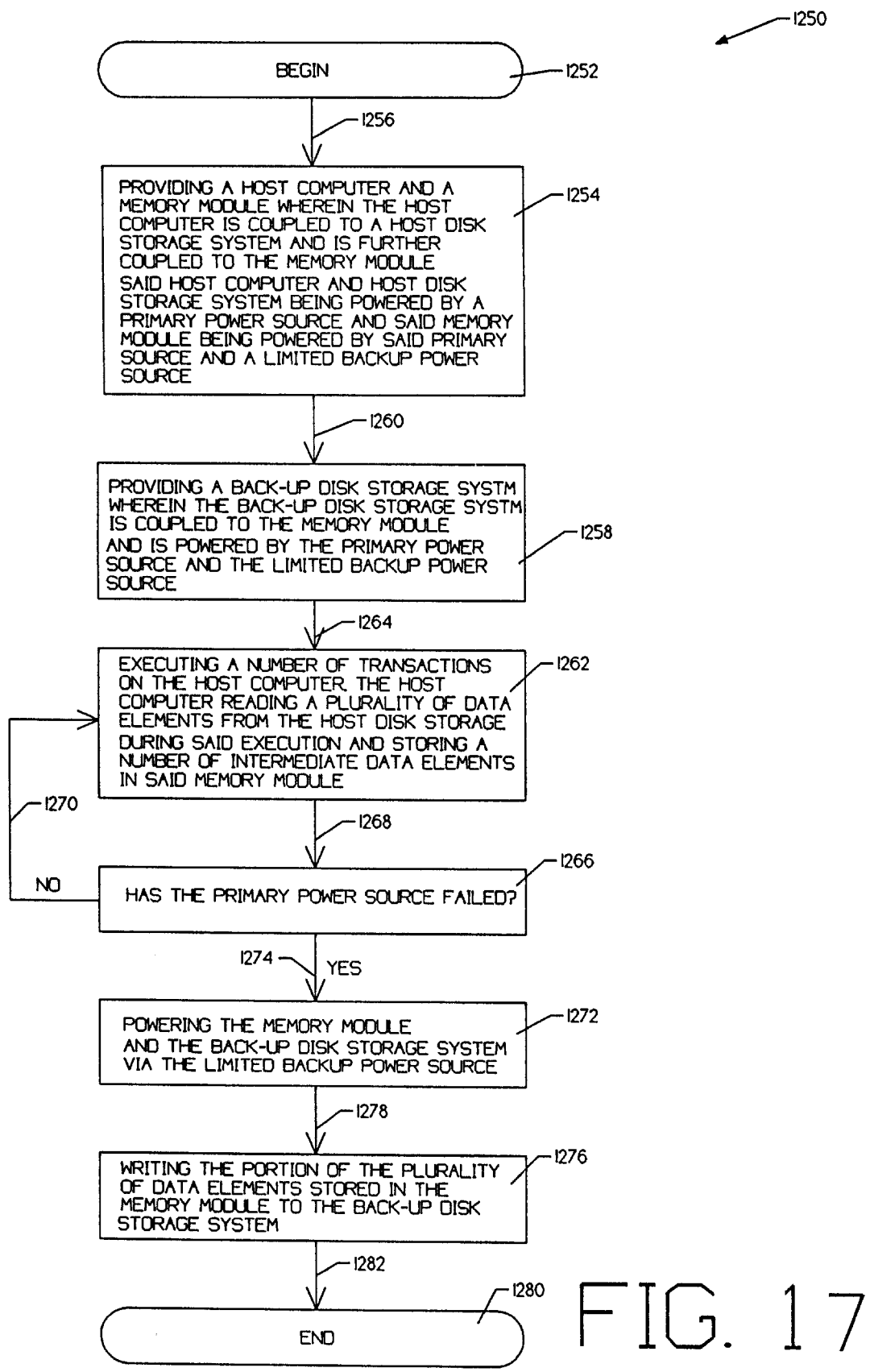
FIG. 17 is a flow diagram showing a third exemplary method of the present invention.

FIG. 17 is a flow diagram showing a third exemplary method of the present invention. The flow diagram is generally shown at 1250. The method is entered at element 1252, wherein control is passed to element 1254 via interface 1256. Element 1254 provides a host computer and a memory module, wherein the host computer is coupled to a host disk storage system, and is further coupled to the memory module. Said host computer and host disk storage system being powered by a primary power source, and said memory module being powered by said primary power source and a limited backup power source. Control is then passed to element 1258 via interface 1260. Element 1258 provides a backup disk storage system, wherein the backup disk storage system is coupled to the memory module and is powered by the primary power source and the limited backup power source. Control is then passed to element 1262 via interface 1264.

Element 1262 executes a number of transactions on the host computer, wherein the host computer reads a plurality of data elements from the host disk storage system during said execution and stores a number of intermediate data elements in said memory module. Control is then passed to element 1266 via interface 1268. Element 1266 determines whether the primary power source has failed or becomes degradated; If the primary power source has not failed or become degradated, control is passed back to element 1262 via interface 1270. If the primary power source has failed or becomes degradated, control is passed to element 1272 via interface 1274. Element 1272 powers the memory module and the backup disk storage system via the limited backup power source. Control is then passed to element 1276 via interface 1278. Element 1276 writes the portion of the plurality of data elements stored in the memory module to the backup disk storage system. Control is then passed to element 1280 via interface 1282, wherein the method is exited.

Figure 18A:
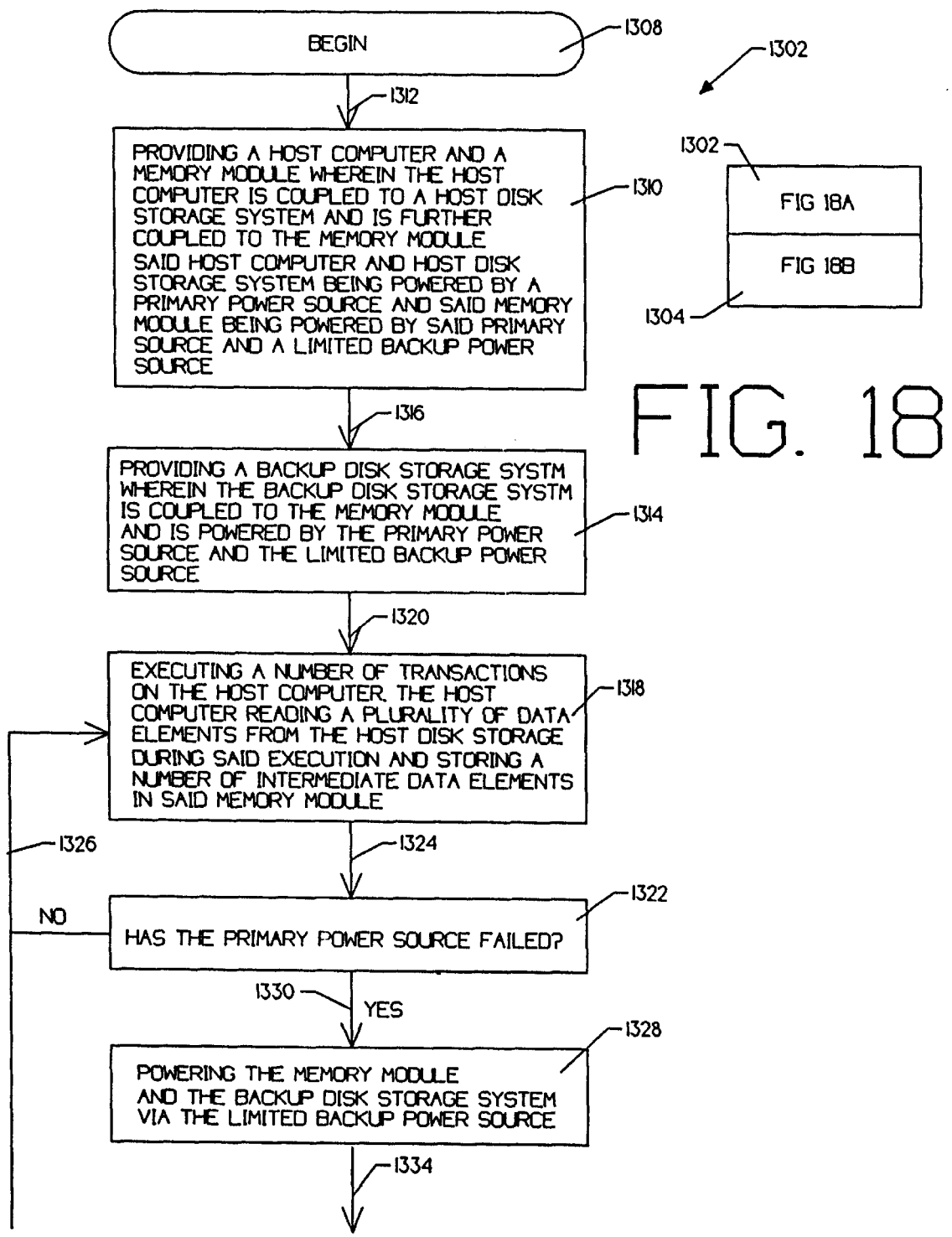
Figure 18B:
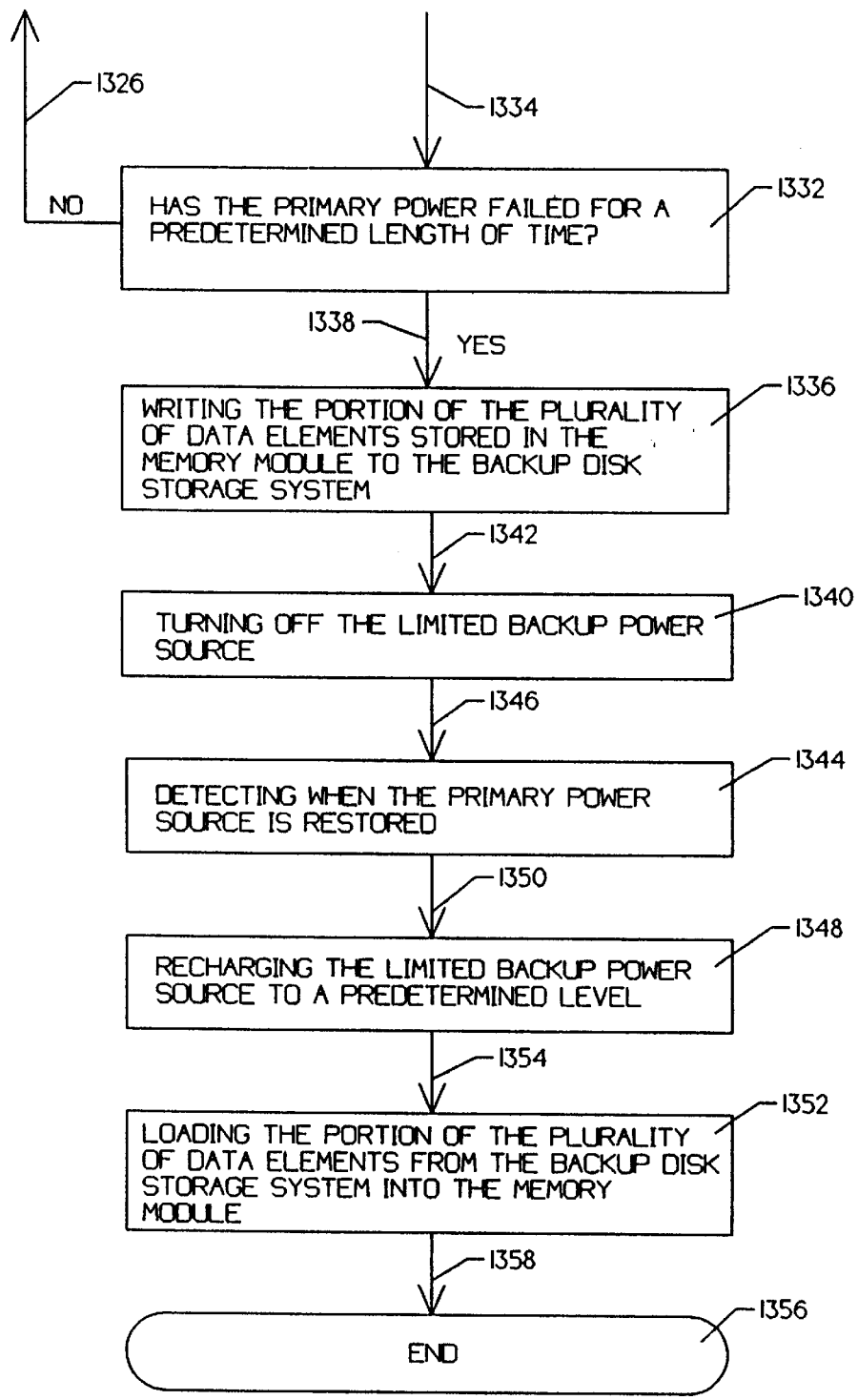

FIGS. 18, 18A, and 18B comprise a flow diagram showing a fourth exemplary method of the present invention. The relationship between FIGS. 18A and 18B is generally shown in FIG. 18. The flow diagram is generally shown at 1302. The method is entered at element 1308, wherein control is passed to element 1310 via interface 1312. Element 1310 provides a host computer and a memory module, wherein the host computer is coupled to a host disk storage system and is further coupled to the memory module. The host computer and host disk storage system being powered by a primary power source and the memory module being powered by the primary power source and a limited backup power source. Control is then passed to element 1314 via interface 1316. Element 1314 provides a backup disk storage system, wherein the backup disk storage system is coupled to the memory module and is powered by the primary power source and the limited backup power source. Control is then passed to element 1318 via interface 1320.

Element 1318 executes a number of transactions on the host computer, wherein the host computer reads a plurality of data elements from the host disk storage system during said execution and stores a number of intermediate data elements in said memory module. Control is then passed to element 1322 via interface 1324.

Element 1322 determines whether the primary power source has failed. If the primary power source has not failed, control is passed back to element 1318 via interface 1326. If the primary power source has failed, control is passed to element 1328 via interface 1330. Element 1328 powers the memory module and the backup disk storage system via the limited backup power source. Control is then passed to element 1332 via interface 1334. Element 1332 determines whether the primary power source failed for a predetermined length of time. If the primary power source has not failed for the predetermined length of time, control is passed back to element 1318 via interface 1326. If the primary power source has failed for a predetermined length of time, control is passed to element 1336 via interface 1338. Element 1336 writes the portion of the plurality of data elements stored in the memory module to the backup disk storage system. Control is then passed to element 1340 via interface 1342.

Element 1340 turns off the limited backup power source. Control is then passed to element 1344 via interface 1346. Element 1344 detects when the primary power source is restored. Control is then passed to element 1348 via interface 1350. Element 1348 recharges the limited backup power source to a predetermined level. Control is then passed to element 1352 via interface 1354. Element 1352 loads the portion of the plurality of data elements from the backup disk storage system into the memory module. Control is then passed to element 1356 via interface 1358, wherein the method is exited.

Figure 19B:
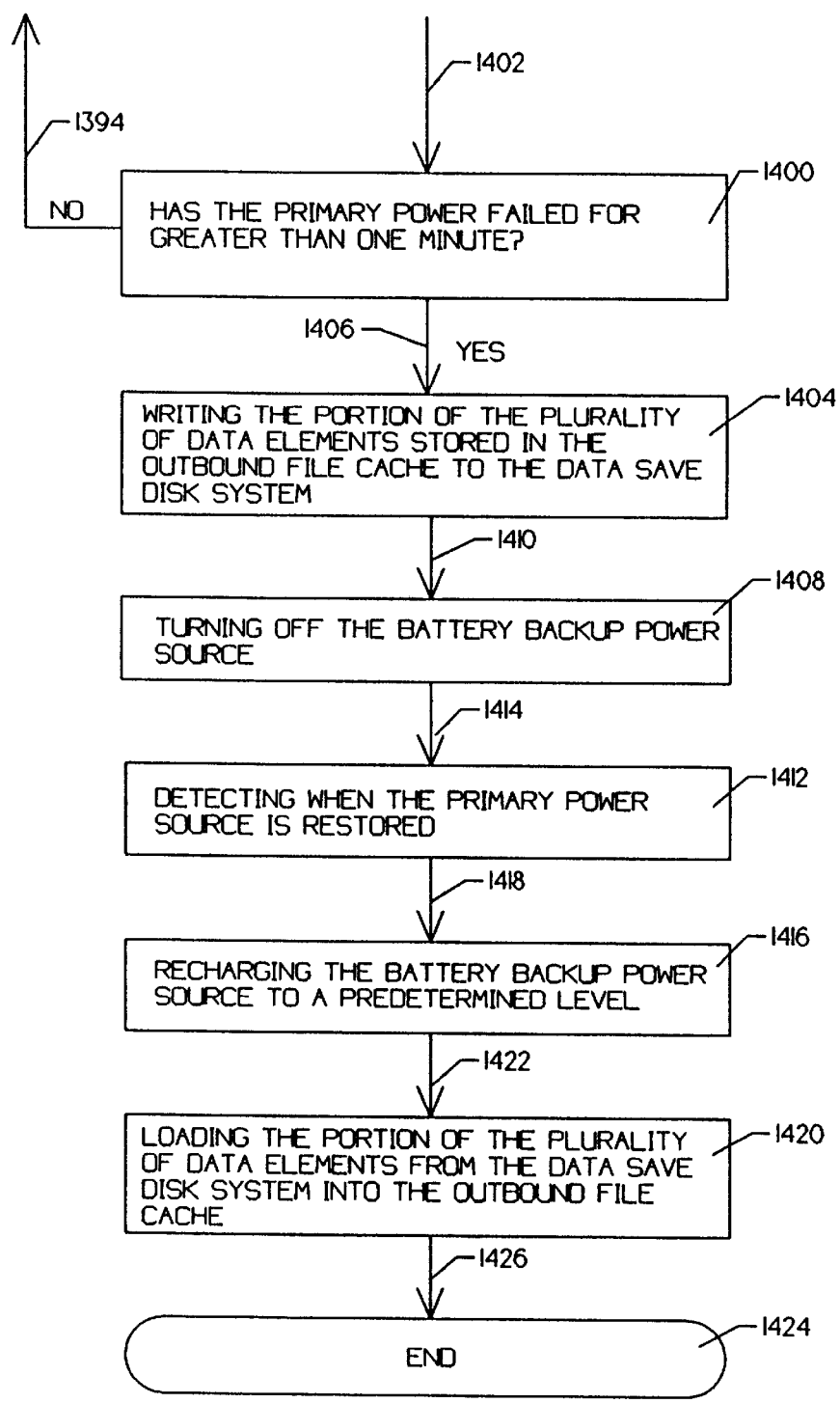

FIGS. 19, 19A, and 19B comprise a flow diagram showing a fifth exemplary method of the present invention. The relationship between FIGS. 19A and 19B is generally shown in FIG. 19. The flow diagram is generally shown at 1370. The method is entered at element 1376, wherein control is passed to element 1378 via interface 1380. Element 1378 provides a host computer and an outbound file cache, wherein the host computer is coupled to a host disk storage system and is further coupled to the outbound file cache. The host computer and host disk storage system being powered by a primary power source, and the outbound file cache being powered by the primary power source and a battery backup power source. Control is then passed to element 1382 via interface 1384. Element 1382 provides a data save disk system, wherein the data save disk system is coupled to the outbound file cache and is powered by the primary power source and the battery backup power source. Control is then passed to element 1386 via interface 1388.

Element 1386 executes a number of transactions on the host computer wherein the host computer reads a plurality of data elements from the host disk storage system during said execution and stores a number of intermediate data elements in said outbound file cache. Control is then passed to element 1390 via interface 1392. Element 1390 determines whether the primary power source has failed. If the primary power source has not failed, control is passed back to element 1386 via interface 1394. If the primary power source has failed, control is passed to element 1396 via interface 1398. Element 1396 powers the outbound file cache and the data save disk system via the battery backup power source. Control is then passed to element 1400 via interface 1402. Element 1400 determines whether the primary power source has failed for greater than one minute. If the primary power source has not failed for greater than one minute, control is passed back to element 1386 via interface 1394. If the primary power source has failed for greater than one minute, control is passed to element 1404 via interface 1406.

Element 1404 writes the portion of the plurality of data elements stored in the outbound data cache to the data save disk system. Control is then passed to element 1408 via interface 1410. Element 1408 turns off the battery backup power source. Control is then passed to element 1412 via interface 1414. Element 1412 detects when the primary power source is restored. Control is then passed to element 1416 via interface 1418. Element 1416 recharges the battery backup power source to a predetermined level. Control is then passed to element 1420 via interface 1422. Element 1420 loads the portion of the plurality of data elements from the data save disk system into the outbound file cache. Control is then passed to element 1424 via interface 1426, wherein the method is exited.

Having thus described the preferred embodiments of the present invention, those of skill in the art will readily appreciate that the teachings found herein may be applied to yet other embodiments within the scope of the claims hereto attached.

We claim:

1. In a data processing system having a host processor, a memory module, and a disk storage device, wherein during normal operation the host processor may perform a disk write operation which stores selected data elements to the disk storage device via the memory module, and may further perform a memory write operation which stores selected data elements to the memory module and not to the disk storage device, the improvement comprising:
   a. primary power source means coupled to the data processing system for providing power to the data processing system;
   b. detecting means coupled to said primary power source means for detecting a degradation in said primary power source means and when the primary power source means is restored;
   c. secondary power source means coupled to the data processing system and further coupled to said detecting means for providing power to at least a portion of the data processing system when said detecting means detects a degradation in said primary power source means;
   d. disk storage controller means coupled to the memory module, the disk storage device, and said detecting means for initiating storage of predetermined ones of the data elements that were stored to the memory module via the memory write operation to the disk storage device a predetermined time period after said detecting means detects a degradation in said primary power source means;
   e. recharging means coupled to said secondary power source means, said detecting means, and to said disk storage controller for recharging the secondary power source means when said detecting means detects the restoration of the primary power source means; and
   wherein said disk storage controller reloading selected data elements from the disk storage device to the host processor only after said recharging means has recharged said secondary power source means to a predetermined level.

2. An improvement according to claim 1 wherein the memory module comprises a memory cache.

3. An improvement according to claim 2 wherein said primary power source means comprises a universal power source.

4. An improvement according to claim 3 wherein said secondary power source means comprises at least one battery.

5. An improvement according to claim 4 wherein said disk storage controller means and said disk storage device comprise a data save disk system.

6. An improvement according to claim 1 wherein said predetermined time period is greater than zero and is less than 1 minute.

7. An improvement according to claim 1 wherein said predetermined time period is greater than or equal to 1 minute.

8. An improvement according to claim 5 wherein the memory module comprises:
   a. storage means for storing the number of data elements; and
   b. interface means coupled to said storage means and further coupled to said data save disk system for providing an interface between said storage means and said data save disk system.

9. An improvement according to claim 8 wherein said data save disk system comprises at least one disk drive.

10. An improvement according to claim 9 wherein said at least one disk drive comprises a SCSI compatible interface.

11. An improvement according to claim 10 wherein said interface means comprises a SCSI compatible interface.

12. An improvement according to claim 11 wherein said interface means comprises:
   a. a data save disk device coupled to said storage means for providing an interface to said storage means; and
   b. a SCSI interface processor coupled to said data save disk device for providing an interface between said data save disk device and said data save disk system.

13. An improvement according to claim 12 wherein said storage means comprises at least one RAM.

14. An improvement according to claim 13 wherein said SCSI interface processor comprises a NCR53C720 SCSI I/O processor.

15. In a data processing system having a host processor, a memory module, and a disk storage device, wherein during normal operation the host processor may perform a disk write operation which stores selected data elements to the disk storage device via the memory module, and may further perform a memory write operation which stores selected data elements to the memory module and not to the disk storage device, the improvement comprising:
   a. primary power source means coupled to the data processing system for providing power to the data processing system;
   b. detecting means coupled to said primary power source means for detecting a degradation in said primary power source means and when the primary power source means is restored;
   c. disk storage controller means coupled to the memory module, the disk storage device, and said detecting means for initiating storage of predetermined ones of the data elements that were stored to the memory module via the memory write operation to the disk storage device a predetermined time period after said detecting means detects a degradation in said primary power source means;
   d. secondary power source means coupled to the memory module, said disk storage controller and said disk storage device for providing power thereto when said detecting means detects a degradation in said primary power source means;
   e. recharging means coupled to said secondary power source means, said detecting means, and to said disk storage controller for recharging the secondary power source means when said detecting means detects the restoration of the primary power source means; and wherein said disk storage controller reloading selected data elements from the disk storage device to the host processor only after said recharging means has recharged said secondary power source means to a predetermined level.

16. An improvement according to claim 15 wherein the memory module comprises a memory cache.

17. An improvement according to claim 16 wherein said primary power source means comprises a universal power source.

18. An improvement according to claim 17 wherein said secondary power source means comprises at least one battery.

19. An improvement according to claim 18 wherein said disk storage controller and the disk storage device comprise a data save disk system.

20. An improvement according to claim 15 wherein said predetermined time period is greater than zero but less than 1 minute.

21. An improvement according to claim 15 wherein said predetermined time period is greater than or equal to 1 minute.

22. An improvement according to claim 19 wherein the memory module comprises:
　a. storage means for storing the number of data elements; and
　b. interface means coupled to said storage means and further coupled to said data save disk system for providing an interface between said storage means and said data save disk system.

23. An improvement according to claim 22 wherein said data save disk system comprises at least one disk drive.

24. An improvement according to claim 23 wherein said at least one disk drive comprises a SCSI compatible interface.

25. An improvement according to claim 24 wherein said interface means comprises a SCSI compatible interface.

26. An improvement according to claim 25 wherein said interface means comprises:
　a. a data save disk device coupled to said storage means for providing an interface to said storage means; and
　b. a SCSI interface processor coupled to said data save disk device for providing an interface between said data save disk device and said data save disk system.

27. An improvement according to claim 26 wherein said storage means comprises at least one SRAM.

28. An improvement according to claim 27 wherein said SCSI interface processor comprises a NCR53C720 SCSI I/O processor.

29. In a data processing system having a host processor, a memory module, and a disk storage device, wherein during normal operation the host processor may perform a disk write operation which stores selected data elements to the disk storage device via the memory module, and may further perform a memory write operation which stores selected data elements to the memory module and not to the disk storage device, the improvement comprising:
　a. at least one primary power source coupled to the data processing system for providing power to the data processing system;
　b. a detecting circuit coupled to said at least one primary power source for detecting a degradation in any of said at least one primary power source and when the degraded primary power source is restored;
　c. at least one secondary power source coupled to the data processing system and further coupled to said detecting circuit for providing power to at least a portion of the data processing system when said detecting means detects a degradation in any of said at least one primary power source;
　c. at least one disk storage controller coupled to the memory module, the disk storage device, and said detecting circuit for initiating storage of predetermined ones of the data elements that were stored to the memory module via the memory write operation to the disk storage device a predetermined time period after said detecting circuit detects a degradation in any of said at least one primary power source;
　e. recharging means coupled to said at least one secondary power source said detecting circuit and to said at least one disk storage controller for recharging the at least one secondary power source when said detecting circuit detects the restoration of the degraded primary power source; and
　wherein said at least disk storage controller reloading selected data elements from the disk storage device to the host processor only after said recharging means has recharged said at least one secondary power source to a predetermined level.

30. An improvement according to claim 29 wherein the memory module comprises a memory cache.

31. An improvement according to claim 30 wherein said primary power source means comprises a universal power source.

32. An improvement according to claim 31 wherein said secondary power source means comprises at least one battery.

33. An improvement according to claim 32 wherein the memory module comprises:
　a. at least one storage circuit for storing the number of data elements; and
　b. at least one interface circuit coupled to said at least one storage circuit and further coupled to said disk storage device for providing an interface between corresponding ones of said at least one storage circuit and said disk storage device.

34. An improvement according to claim 33 wherein each of said at least one interface circuit comprises:
　a. a data save disk device coupled to a corresponding one of said at least one storage circuit for providing an interface to said corresponding at least one storage circuit; and
　b. a SCSI interface processor coupled to said data save disk device for providing an interface between said data save disk device and said disk storage device.

35. In a data processing system having a host processor, a memory module, and a disk storage device, wherein during normal operation the host processor may perform a disk write operation which stores selected data elements to the disk storage device via the memory module, and may further perform a memory write operation which stores selected data elements to the memory module and not to the disk storage device, the improvement comprising:
　a. at least one primary power source coupled to the data processing system for providing power to the data processing system;
　b. a detecting circuit coupled to said at least one primary power source for detecting a degradation in any of said at least one primary power source and when the degraded primary power source is restored;

c. at least one disk storage controller coupled to the memory module, the disk storage device, and said detecting circuit for initiating storage of predetermined ones of the data elements that were stored to the memory module via the memory write operation to the disk storage device a predetermined time period after said detecting circuit detects a degradation in any of said at least one primary power source;

d. at least one secondary power source coupled to the memory module and said at least one disk storage controller for providing power to the memory module, said at least one disk storage controller, and the disk storage device when said detecting means detects a degradation in any of said at least one primary power source;

e. recharging means coupled to said at least one secondary power source, said detecting circuit, and to said at least one disk storage controller for recharging the at least one secondary power source when said detecting circuit detects the restoration of the degraded primary power source; and wherein said at least disk storage controller reloading selected data elements from the disk storage device to the host processor only after said recharging means has recharged said at least one secondary power source to a predetermined level.

36. An improvement according to claim 35 wherein the memory module comprises a memory cache.

37. An improvement according to claim 36 wherein said primary power source means comprises a universal power source.

38. An improvement according to claim 37 wherein said secondary power source means comprises at least one battery.

39. An improvement according to claim 38 wherein the memory module comprises:

a. at least one storage circuit for storing the number of data elements; and b. at least one interface circuit coupled to said at least one storage circuit and further coupled to the disk storage device for providing an interface between corresponding ones of said at least one storage circuit and said disk storage device.

40. An improvement according to claim 39 wherein each of said at least one interface circuit comprises:

a. a data save disk device coupled to a corresponding one of said at least one storage circuit for providing an interface to said corresponding at least one storage circuit; and b. a SCSI interface processor coupled to said data save disk device for providing an interface between said data save disk device and said disk storage device.

41. A method for storing a number of data element from a memory module of a computer system to a disk storage system, the computer system having a host processor and a memory module, during normal operation the host processor may perform a disk write operation which stores selected data elements to the disk storage system via the memory module, and may further perform a memory write operation which stores selected data elements to the memory module and not to the disk storage system, the computer system further having a primary power source and a secondary power source, the method comprising the steps of:

a. providing an interface between the memory module and the disk storage system;

b. detecting a degradation of the primary power source;

c. Powering the computer system via the secondary power source once said detecting step (b) detects a degradation in the primary power source;

d. Initiating storage of predetermined ones of the data elements that were stored to the memory module via the memory write operation from the memory module to the disk storage system via said interface a predetermined time period after said detecting step (b) detects a degradation of the primary power source;

e. powering down the secondary power source after said storing step (d) is complete;

f. detecting when the primary power source is restored;

g. recharging the secondary power source to a predetermined level; and h. loading predetermined ones of the number of data elements that were stored in the storing step (d) from the disk storage system to the memory module only after the secondary power source is recharged to the predetermined level.

42. A method for storing a number of data elements from a data processing system to a disk storage system after a power degradation occurs, the method comprising the steps of:

a. providing a host processor and a memory module wherein during normal operation said host processor performs a disk write operation which stores selected data elements to the disk storage system via the memory module, and further performs a memory write operation which stores selected data elements to the memory module and not to the disk storage system;

b. providing at least one primary power source wherein said at least one primary power source is coupled to the data processing system for providing power to at least a portion of the data processing system;

c. providing at least one secondary power source wherein said at least one secondary power source is coupled to said memory module and to said disk storage system;

d. detecting a degradation in any of said at least one primary power source;

e. providing power via said at least one secondary power source to said memory module and to the disk storage system when said detecting step (d) detects a degradation in any of said at least one primary power source;

f. initiating storage of predetermined ones of the data elements that were stored to the memory module via the memory write operation from the memory module to the disk storage system a predetermined time period after said detecting step (d) detects a degradation in any of the said at least one primary power source;

g. powering down said at least one secondary power source after said storing step (f) is complete;

h detecting when said at least one primary power source is restored;

i recharging the secondary power source to a predetermined level; and j loading predetermined ones of the number of data elements that were stored to the memory module via the memory operation from said at least one disk storage system to said memory module only after said at least one secondary power source is recharged to the predetermined level.

43. In a data processing system having a host processor and a disk storage device, wherein during normal operation the host processor may perform a disk write operation which stores selected data elements to the disk storage device, the improvement comprising:

a. primary power source coupled to the data processing system for providing power to the data processing system;

b. detecting circuit coupled to said primary power source means for detecting a degradation in said primary power source and when the primary power source is restored;

c. Secondary power source coupled to the data processing system and further coupled to said detecting circuit for providing power to at least a portion of the data processing system when said detecting circuit detects a degradation in said primary power source means;

d. A controller coupled to the host processor and said detecting circuit for initiating storage of selected data elements that are stored in the host processor to the disk storage device after said detecting circuit detects a degradation in said primary power source, said controller further disengaging said secondary power source after the selected data elements are stored to the disk storage device;

e. recharging means coupled to said detecting circuit, said secondary power source and to said controller for recharging the secondary power source after the power source is disengaged by said controller and when the primary power source is restored; and f said controller reloading selected data elements from the disk storage device to the host processor only after said recharging means has recharged said secondary power source to a predetermined level.

* * * * *